(12) United States Patent
Zhang et al.

(10) Patent No.: US 11,914,111 B2
(45) Date of Patent: Feb. 27, 2024

(54) IMAGING LENS ASSEMBLY

(71) Applicant: ZHEJIANG SUNNY OPTICS CO., LTD., Zhejiang (CN)

(72) Inventors: Yi Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 306 days.

(21) Appl. No.: 17/366,058

(22) Filed: Jul. 2, 2021

(65) Prior Publication Data

US 2022/0003970 A1  Jan. 6, 2022

(30) Foreign Application Priority Data

Jul. 3, 2020 (CN) .......................... 202010631263.8

(51) Int. Cl.
*G02B 13/18* (2006.01)
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ............ G02B 13/0045; G02B 13/0055; G02B 13/0075; G02B 9/62
See application file for complete search history.

(56) References Cited

U.S. PATENT DOCUMENTS

| 2004/0004757 | A1* | 1/2004 | Schuster ............. G03F 7/70241 |
| | | | 359/365 |
| 2005/0111108 | A1* | 5/2005 | Schuster ............. G03F 7/70241 |
| | | | 359/649 |
| 2019/0033556 | A1* | 1/2019 | Tang ....................... H04N 23/55 |
| 2019/0107689 | A1 | 4/2019 | Huang |
| 2019/0121100 | A1 | 4/2019 | Song et al. |

FOREIGN PATENT DOCUMENTS

JP          6759593 B2 *  9/2020

\* cited by examiner

*Primary Examiner* — Pinping Sun
*Assistant Examiner* — Mackenzi Waddell
(74) *Attorney, Agent, or Firm* — Gang Yu

(57) ABSTRACT

The disclosure provides an imaging lens assembly, which sequentially includes, from an object side to an image side along an optical axis, a movable diaphragm, a first lens with a positive refractive power, a second lens with a negative refractive power, a third lens with a refractive power, a fourth lens with a refractive power, a fifth lens with a refractive power and a sixth lens with a negative refractive power, wherein TSmin is a distance from the movable diaphragm at a minimum distance from an imaging surface of the imaging lens assembly to an object-side surface of the first lens on the optical axis, TSmax is a distance from the movable diaphragm at a maximum distance from the imaging surface of the imaging lens assembly to the object-side surface of the first lens on the optical axis and EPDmin is a minimum entrance pupil diameter of the imaging lens assembly.

13 Claims, 24 Drawing Sheets

IMAGING LENS ASSEMBLY

CROSS-REFERENCE TO RELATED APPLICATIONS

The disclosure claims priority to Chinese Patent Application No. 202010631263.8, filed to the National Intellectual Property Administration, PRC (CNIPA) on Jul. 3, 2020, the disclosure of which is hereby incorporated by reference in its entirety.

TECHNICAL FIELD

The disclosure relates to the field of optical elements, and particularly to an imaging lens assembly.

BACKGROUND

In recent years, with the rapid development of portable electronic products such as smart phones, imaging lens assemblies applied to portable electronic products such as smart phones have also been developed rapidly, users have made more and more requirements on imaging lens assemblies applied to portable electronic products such as smart phones, and meanwhile, imaging lens assemblies with characteristics of ultra-thin design, long focal length, ultra-long focal length, periscopic long focal length, wide angle and the like have gradually been presented to users.

With the increase of requirements of users on functions of imaging lens assemblies of portable electronic products such as smart phones, how to achieve an effect of a relatively large depth of field during shooting of a portrait on the basis of achieving a small size and compact structure of a lens is a goal pursued by many users at present.

SUMMARY

Some embodiments of the disclosure provides an imaging lens assembly, which sequentially includes, from an object side to an image side along an optical axis, a movable diaphragm, a first lens with a positive refractive power, a second lens with a negative refractive power, a third lens with a refractive power, a fourth lens with a refractive power, a fifth lens with a refractive power and a sixth lens with a negative refractive power, wherein TSmin is a distance from the movable diaphragm at a minimum distance from an imaging surface of the imaging lens assembly to an object-side surface of the first lens on the optical axis, TSmax is a distance from the movable diaphragm at a maximum distance from the imaging surface of the imaging lens assembly to the object-side surface of the first lens on the optical axis, EPDmin is a minimum entrance pupil diameter (EPD) of the imaging lens assembly, TSmin and TSmax and EPDmin may meet $1 \leq EPDmin/(|TSmin|+|TSmax|) \leq 2.5$.

In an implementation mode, the object-side surface of the first lens to an image-side surface of the sixth lens include at least one aspheric mirror surface.

In an implementation mode, ImgH is a half of a diagonal length of an effective pixel region on an imaging surface of the imaging lens assembly, a total effective focal length f of the imaging lens assembly and ImgH may meet $3.0 < f/ImgH < 5.0$.

In an implementation mode, a total effective focal length f of the imaging lens assembly and a curvature radius R11 of an object-side surface of the sixth lens may meet $-3.5 < R11/f < -2.0$.

In an implementation mode, the total effective focal length f of the imaging lens assembly, a curvature radius R10 of an image-side surface of the fifth lens and the curvature radius R11 of the object-side surface of the sixth lens may meet $-1.5 < f/R10+f/R11 \leq -0.8$.

In an implementation mode, an effective focal length f2 of the second lens and an effective focal length f6 of the sixth lens may meet $1.5 \leq f6/f2 \leq 2.0$.

In an implementation mode, a total effective focal length f of the imaging lens assembly and an effective focal length f1 of the first lens may meet $1.0 < f/f1 < 1.5$.

In an implementation mode, a total effective focal length f of the imaging lens assembly and an effective focal length f2 of the second lens may meet $-1.6 < f/f2 < -0.9$.

In an implementation mode, a total effective focal length f of the imaging lens assembly, a curvature radius R4 of an image-side surface of the second lens and a curvature radius R5 of an object-side surface of the third lens may meet $|f/R4-f/R5| < 1.0$.

In an implementation mode, SAG22 is a distance from an intersection point of an image-side surface of the second lens and the optical axis to a maximum effective radius vertex of the image-side surface of the second lens on the optical axis and SAG31 is a distance from an intersection point of an object-side surface of the third lens and the optical axis to a maximum effective radius vertex of the object-side surface of the third lens on the optical axis, SAG22 and SAG31 may meet $0.7 \leq SAG22/SAG31 \leq 1.2$.

In an implementation mode, SAG42 is a distance from an intersection point of an image-side surface of the fourth lens and the optical axis to a maximum effective radius vertex of the image-side surface of the fourth lens on the optical axis, a center thickness CT4 of the fourth lens on the optical axis and a spacing distance T45 of the fourth lens and the fifth lens on the optical axis and SAG42 may meet $0.8 \leq (CT4+SAG42)/T45 \leq 1.1$.

In an implementation mode, SAG52 is a distance from an intersection point of an image-side surface of the fifth lens and the optical axis to a maximum effective radius vertex of the image-side surface of the fifth lens on the optical axis, SAG61 is a distance from an intersection point of an object-side surface of the sixth lens and the optical axis to a maximum effective radius vertex of the object-side surface of the sixth lens on the optical axis and a spacing distance T56 of the fifth lens and the sixth lens on the optical axis, SAG52 and SAG61 may meet $1.0 \leq (SAG52-T56)/SAG61 \leq 1.2$.

In an implementation mode, a maximum effective radius DT11 of the object-side surface of the first lens and a maximum effective radius DT62 of an image-side surface of the sixth lens may meet $0.5 < DT62/DT11 \leq 1.0$.

In an implementation mode, a maximum effective radius DT31 of an object-side surface of the third lens, a maximum effective radius DT41 of an object-side surface of the fourth lens and a maximum effective radius DT52 of an image-side surface of the fifth lens may meet $1.5 < (DT31-DT41)/(DT52-DT41) < 2.0$.

Another aspect of the disclosure provides an imaging lens assembly, which sequentially includes, from an object side to an image side along an optical axis, a movable diaphragm, a first lens with a positive refractive power, a second lens with a negative refractive power, a third lens with a refractive power, a fourth lens with a refractive power, a fifth lens with a refractive power and a sixth lens with a negative refractive power, wherein a total effective focal length f of the imaging lens assembly and a curvature radius R11 of an object-side surface of the sixth lens may meet −3.5<R11/f<−2.0.

According to the disclosure, multiple (for example, six) lenses are adopted, and the refractive power and surface types of each lens, the center thickness of each lens, on-axis distances between the lenses and the like are reasonably configured to achieve at least one beneficial effect of small size, compact structure, variable aperture, high imaging quality and the like of the imaging lens assembly.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
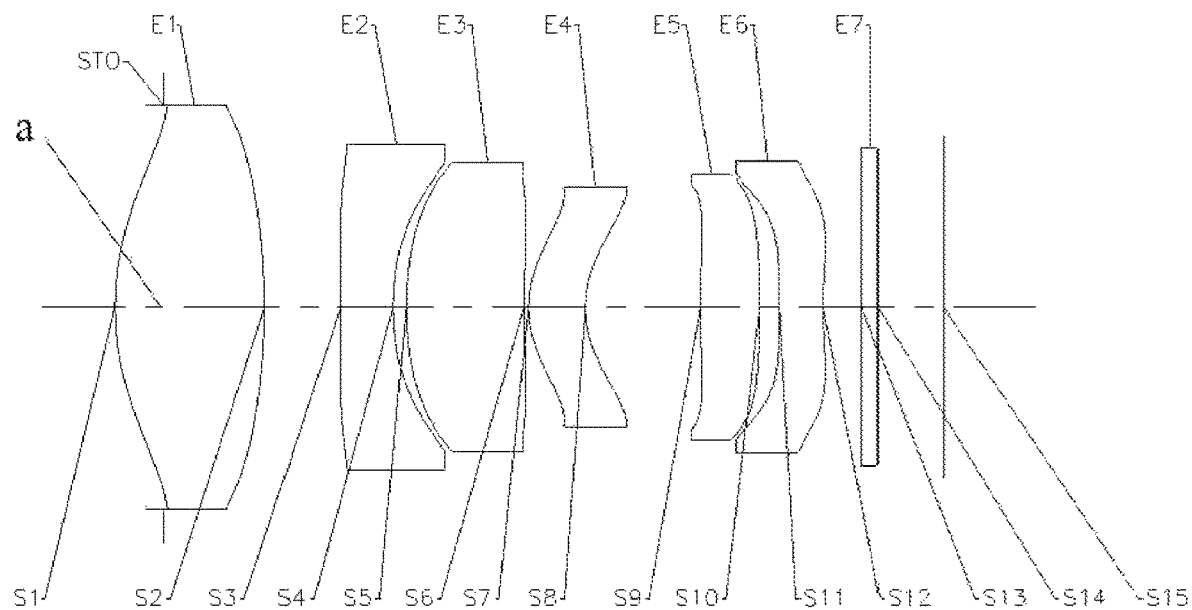
FIG. 1 shows a structure diagram of an imaging lens assembly according to embodiment 1 of the disclosure, a movable diaphragm being at a minimum distance from an imaging surface of the imaging lens assembly.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An imaging lens assembly according to an exemplary implementation mode of the disclosure may include six lenses with a refractive power, i.e., a first lens, a second lens, a third lens, a fourth lens, a fifth lens and a sixth lens respectively. The six lenses are sequentially arranged from an object side to an image side along an optical axis. In the first lens to the sixth lens, there may be a spacing distance between any two adjacent lenses.

In the exemplary implementation mode, the first lens may has a positive refractive power; the second lens may has a negative refractive power; the third lens may has a positive refractive power or a negative refractive power; the fourth lens may has a positive refractive power or a negative refractive power; the fifth lens may has a positive refractive power or a negative refractive power; and the sixth lens may has a negative refractive power.

Figure 2:
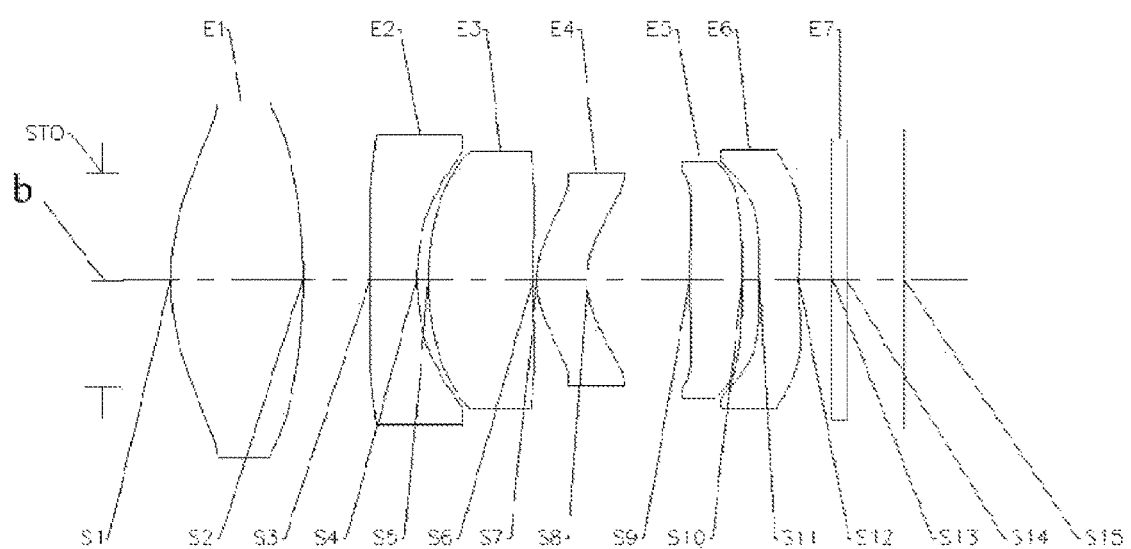
FIG. 2 shows a structure diagram of an imaging lens assembly according to embodiment 1 of the disclosure, a movable diaphragm being at a maximum distance from an imaging surface of the imaging lens assembly.

In the exemplary implementation mode, the imaging lens assembly according to the disclosure may further include a movable diaphragm arranged between the object side and the first lens. As shown in FIG. 1 and FIG. 2, the movable diaphragm may be arranged in a manner of sliding along the optical axis. Specifically, the movable diaphragm may slide between a position a at a minimum distance from an imaging surface of the imaging lens assembly and a position b at a maximum distance from the imaging surface of the imaging lens assembly. Specifically, the movable diaphragm may move to the position a at the minimum distance from the imaging surface of the imaging lens assembly, as shown in FIG. 1. The movable diaphragm may move to the position b at the maximum distance from the imaging surface of the imaging lens assembly, as shown in FIG. 2. Under the condition that the imaging lens assembly has a relatively large total effective focal length, a moving range of the movable diaphragm is relatively large, and an f-number of the system may change in a relatively large range.

In the exemplary implementation mode, the imaging lens assembly according to the disclosure may meet $1 \leq \text{EPDmin}/(|\text{TSmin}|+|\text{TSmax}|) \leq 2.5$, wherein TSmin is a distance from the movable diaphragm at the minimum distance from the imaging surface of the imaging lens assembly to an object-side surface of the first lens on the optical axis, TSmax is a distance from the movable diaphragm at the maximum distance from the imaging surface of the imaging lens assembly to the object-side surface of the first lens on the optical axis, and EPDmin is a minimum EPD of the imaging lens assembly. $1 \leq \text{EPDmin}/(|\text{TSmin}|+|\text{TSmax}|) \leq 2.5$ is met, so that a magnitude of the minimum EPD may be controlled to ensure that a position of the movable diaphragm is in a reasonable range and switch an f-number of the imaging lens assembly between different values to help to meet a requirement on a large depth of field during shooting of a portrait.

In the exemplary implementation mode, the imaging lens assembly according to the disclosure may meet $3.0 < f/\text{ImgH} < 5.0$, wherein f is a total effective focal length of the imaging lens assembly, and ImgH is a half of a diagonal length of an effective pixel region on the imaging surface of the imaging lens assembly. More specifically, f and ImgH may further meet $3.4 < f/\text{ImgH} < 4.2$. $3.0 < f/\text{ImgH} < 5.0$ is met, so that a relatively large total effective focal length and relatively large field of view (FOV) of the system may be ensured effectively, and meanwhile, a relatively large aperture of the system may also be ensured to provide a precondition for the movable diaphragm.

In the exemplary implementation mode, the imaging lens assembly according to the disclosure may meet $-3.5<R11/f<-2.0$, wherein f is the total effective focal length of the imaging lens assembly, and R11 is a curvature radius of an object-side surface of the sixth lens. More specifically, R11 and f may further meet $-3.0<R11/f<-2.3$. $-3.5<R11/f<-2.0$ is met, so that astigmatism and coma contributions of the sixth lens may be controlled in a reasonable range, and astigmatism and coma left by the previous lens may be balanced effectively to achieve higher imaging quality of the lens set.

In the exemplary implementation mode, the imaging lens assembly according to the disclosure may meet $-1.5<f/R10+f/R11\leq-0.8$, wherein f is the total effective focal length of the imaging lens assembly, R10 is a curvature radius of an image-side surface of the fifth lens, and R11 is the curvature radius of the object-side surface of the sixth lens. More specifically, f, R10 and R11 may further meet $-1.3<f/R10+f/R11\leq-0.8$. $-1.5<f/R10+f/R11\leq-0.8$ is met, so that third-order astigmatism of the fifth lens and the sixth lens may be controlled in a reasonable range, and furthermore, the astigmatism generated by a front-end optical lens may be balanced to achieve high imaging quality of the system.

In the exemplary implementation mode, the imaging lens assembly according to the disclosure may meet $1.5\leq f6/f2\leq 2.0$, wherein f2 is an effective focal length of the second lens, and f6 is an effective focal length of the sixth lens. $1.5\leq f6/f2\leq 2.0$ is met, so that a spherical aberration generated by the second lens and the sixth lens may be controlled in a relatively small reasonable range reasonably to help the other optical elements to balance the left spherical aberration with a relatively low load and further make it likely to ensure the image quality of the optical system in an on-axis field of view.

In the exemplary implementation mode, the imaging lens assembly according to the disclosure may meet $1.0<f/f1<1.5$, wherein f is the total effective focal length of the imaging lens assembly, and f1 is an effective focal length of the first lens. $1.0<f/f1<1.5$ is met, so that a residual after positive and negative spherical aberrations generated by the first two lenses are balanced may be controlled in a relatively small reasonable range reasonably to help the other optical elements to balance the left spherical aberration with a relatively low load and further make it likely to ensure the image quality of the optical system in the on-axis field of view.

In the exemplary implementation mode, the imaging lens assembly according to the disclosure may meet $-1.6<f/f2<-0.9$, wherein f is the total effective focal length of the imaging lens assembly, and f2 is the effective focal length of the second lens. $-1.6<f/f2<-0.9$ is met, so that negative refractive power required by the system may be provided by the second lens, and a spherical aberration contribution of the second lens may also be controlled in a reasonable range to ensure that the optical lenses after the second lens may correct negative spherical aberration contributions thereof reasonably and ensure relatively high image quality of the system in the on-axis field of view.

In the exemplary implementation mode, the imaging lens assembly according to the disclosure may meet $|f/R4-f/R5|<1.0$, wherein f is the total effective focal length of the imaging lens assembly, R4 is a curvature radius of an image-side surface of the second lens, and R5 is the curvature radius of an object-side surface of the third lens. More specifically, f, R4 and R5 may further meet $|f/R4-f/R5|<0.9$. $|f/R4-f/R5|<1.0$ is met, so that third-order spherical aberrations of the second lens and the third lens may be controlled in a reasonable range, and furthermore, the astigmatism generated by the other optical lenses may be balanced to achieve high imaging quality of the system.

In the exemplary implementation mode, the imaging lens assembly according to the disclosure may meet $0.7\leq SAG22/SAG31\leq 1.2$, wherein SAG22 is a distance from an intersection point of the image-side surface of the second lens and the optical axis to a maximum effective radius vertex of the image-side surface of the second lens on the optical axis, and SAG31 is a distance from an intersection point of the object-side surface of the third lens and the optical axis to a maximum effective radius vertex of the object-side surface of the third lens on the optical axis. $0.7\leq SAG22/SAG31\leq 1.2$ is met, so that the second lens and the third lens may be prevented from being curved excessively, difficulties in machining may be reduced, and the spherical aberration of the camera lens set may be reduced.

In the exemplary implementation mode, the imaging lens assembly according to the disclosure may meet $0.8\leq (CT4+SAG42)/T45\leq 1.1$, wherein SAG42 is a distance from an intersection point of an image-side surface of the fourth lens and the optical axis to a maximum effective radius vertex of the image-side surface of the fourth lens on the optical axis, CT4 is a center thickness of the fourth lens on the optical axis, and T45 is a spacing distance of the fourth lens and the fifth lens on the optical axis. $0.8\leq (CT4+SAG42)/T45\leq 1.1$ is met, so that a spherical aberration generated by the fourth lens may be controlled, meanwhile, a field curvature generated between the fourth lens and the fifth lens may be reduced, the field curvature sensitivity of the whole lens may be reduced, and the yield of the system may be improved.

In the exemplary implementation mode, the imaging lens assembly according to the disclosure may meet $1.0\leq (SAG52-T56)/SAG61\leq 1.2$, wherein SAG52 is a distance from an intersection point of the image-side surface of the fifth lens and the optical axis to a maximum effective radius vertex of the image-side surface of the fifth lens on the optical axis, and SAG61 is a distance from an intersection point of the object-side surface of the sixth lens and the optical axis to a maximum effective radius vertex of the object-side surface of the sixth lens on the optical axis, and T56 is a spacing distance of the fifth lens and the sixth lens on the optical axis. Meeting $1.0\leq (SAG52-T56)/SAG61\leq 1.2$ is favorable for ensuring machining, forming and assembling of the fifth lens and the sixth lens to achieve high imaging quality, otherwise it is difficult to regulate a formed surface type, a deformation rate after assembling is high, and furthermore, the imaging quality cannot be ensured.

In the exemplary implementation mode, the imaging lens assembly according to the disclosure may meet $0.5<DT62/DT11\leq 1.0$, wherein DT11 is a maximum effective radius of the object-side surface of the first lens, and DT62 is a maximum effective radius of an image-side surface of the sixth lens. More specifically, DT62 and DT11 may further meet $0.6 DT62/DT11\leq 1.0$. $0.5<DT62/DT11\leq 1.0$ is met, so that an effective radius of the whole lens may be ensured in a reasonable range effectively, a size of a lens barrel may be matched reasonably, and the characteristic of small size of the whole imaging lens assembly may be ensured.

In the exemplary implementation mode, the imaging lens assembly according to the disclosure may meet $1.5<(DT31-DT41)/(DT52-DT41)<2.0$, wherein DT31 is a maximum effective radius of the object-side surface of the third lens, DT41 is a maximum effective radius of an object-side surface of the fourth lens, and DT52 is a maximum effective radius of the image-side surface of the fifth lens. More specifically, DT31, DT41 and DT52 may further meet 1.7<(DT31−DT41)/(DT52−DT41)<2.0. 1.5<(DT31−DT41)/(DT52−DT41)<2.0 is met, so that the size of the lens may be reduced to ensure that the system may meet requirements on both the optical performance and the structure.

In the exemplary implementation mode, the imaging lens assembly according to the disclosure may further include an optical filter configured to correct a chromatic aberration and/or protective glass configured to protect a photosensitive element on the imaging surface. The imaging lens assembly according to the implementation mode of the disclosure may adopt multiple lenses, for example, the abovementioned six. The refractive power and surface types of each lens, the center thickness of each lens, on-axis distances between the lenses and the like are reasonably configured to effectively reduce the size of the imaging lens assembly, improve the machinability of the imaging lens assembly and ensure that the imaging lens assembly is more favorable for production and machining and applicable to a portable electronic product. The imaging lens assembly as configured above has the characteristics of small size, variable aperture, compact structure, relatively large depth of field, high imaging quality and the like, and may meet using requirements of various portable electronic products in a shooting scenario.

In the implementation mode of the disclosure, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible to further improve the imaging quality. Optionally, at least one of the object-side surface and image-side surface of each lens in the first lens, the second lens, the third lens, the fourth lens, the fifth lens and the sixth lens is an aspheric mirror surface. Optionally, both the object-side surface and image-side surface of each lens in the first lens, the second lens, the third lens, the fourth lens, the fifth lens and the sixth lens are aspheric mirror surfaces.

However, those skilled in the art should know that the number of the lenses forming the imaging lens assembly may be changed without departing from the technical solutions claimed in the disclosure to achieve each result and advantage described in the specification. For example, although descriptions are made in the implementation with six lenses as an example, the imaging lens assembly is not limited to six lenses. If necessary, the imaging lens assembly may further include another number of lenses.

Specific embodiments applied to the imaging lens assembly of the abovementioned implementation mode will further be described below with reference to the drawings.

Embodiment 1

An imaging lens assembly according to embodiment 1 of the disclosure will be described below with reference to FIG. 1 to FIG. 4C. FIG. 1 and FIG. 2 are structure diagrams of an imaging lens assembly of which a movable diaphragm is at a minimum distance and a maximum distance from an imaging surface of the imaging lens assembly according to embodiment 1 of the disclosure respectively.

As shown in FIG. 1 and FIG. 2, the imaging lens assembly sequentially includes, from an object side to an image side, a movable diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

Table 1 shows a basic parameter table of the imaging lens assembly of embodiment 1, and units of the curvature radius, the thickness/distance and the focal length are all millimeter (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspheric | 5.0445 | 1.9454 | 1.546 | 56.14 | 6.76 | 0.3337 |
| S2 | Aspheric | −10.0323 | 0.9847 | | | | 0.0000 |
| S3 | Aspheric | −24.3260 | 0.6789 | 1.645 | 23.53 | −5.99 | 67.7690 |
| S4 | Aspheric | 4.0205 | 0.1742 | | | | 0.0000 |
| S5 | Aspheric | 6.2100 | 1.5290 | 1.546 | 56.14 | 19.77 | 0.0315 |
| S6 | Aspheric | 13.3519 | 0.0594 | | | | 2.3336 |
| S7 | Aspheric | 1.9168 | 0.7445 | 1.546 | 56.14 | 24.28 | −1.2120 |
| S8 | Aspheric | 1.9336 | 1.5000 | | | | −0.4354 |
| S9 | Aspheric | 17.6310 | 0.7700 | 1.667 | 20.37 | 10.87 | −12.5525 |
| S10 | Aspheric | −12.1045 | 0.2528 | | | | −8.8895 |
| S11 | Spherical | −21.2148 | 0.5700 | 1.546 | 56.14 | −9.21 | |

TABLE 1-continued

| Surface number | Surface type | Curvature radius | Thickness/ distance | Material Refractive index | Abbe number | Focal length | Conic coefficient |
|---|---|---|---|---|---|---|---|
| S12 | Spherical | 6.6467 | 0.5003 | | | | |
| S13 | Spherical | Infinite | 0.2100 | 1.518 | 64.17 | | |
| S14 | Spherical | Infinite | 0.8483 | | | | |
| S15 | Spherical | Infinite | | | | | |

In the example, a total effective focal length f of the imaging lens assembly is 9.12 mm, TSmin is a distance from the movable diaphragm at the minimum distance from the imaging surface of the imaging lens assembly to the object-side surface of the first lens on an optical axis, a value of TSmin is −0.6355 mm, TSmax is a distance from the movable diaphragm at the maximum distance from the imaging surface of the imaging lens assembly to the object-side surface of the first lens on the optical axis, a value of TSmax is 1.0000 mm, an f-number FNOmin of the imaging lens assembly when the distance from the movable diaphragm to the imaging surface of the imaging lens assembly on the optical axis is minimum is 1.46, an f-number FNOmax of the imaging lens assembly when the distance from the movable diaphragm to the imaging surface of the imaging lens assembly on the optical axis is maximum is 2.45, and a maximum field of view of the imaging lens assembly is 31.7°.

In embodiment 1, both the object-side surface and image-side surface of any lens in the first lens E1 to the sixth lens E6 are aspheric surfaces, and a surface type of each aspheric lens may be defined through, but not limited to, the following aspheric surface formula:

$$x = \frac{ch^2}{1 + \sqrt{1 - (k+1)c^2h^2}} + \sum A_i h^i, \tag{1}$$

wherein x is a distance vector height of a distance between the aspheric surface and a vertex of the aspheric surface when the aspheric surface is located at a position with the height h along the optical axis direction, c=1/R (namely, the paraxial curvature c is a reciprocal of the curvature radius R in Table 1 above); k is a cone coefficient; and Ai is a correction coefficient of the i-th order of the aspheric surface. The following Table 2-1 and Table 2-2 show high-order coefficients A4, A6, A8, A10, A12, A14, A16, A18, A20, A22 and A24 that can be used for each of aspheric mirror surfaces S1 and S12 in embodiment 1.

TABLE 2-1

| Surface number | A4 | A6 | A8 | A10 | A12 | A14 |
|---|---|---|---|---|---|---|
| S1 | −3.7200E−01 | −4.2451E−02 | −2.3426E−03 | 1.8346E−05 | −1.9274E−04 | −8.4174E−05 |
| S2 | 1.8628E−01 | −3.1325E−02 | 1.0262E−03 | −4.3866E−03 | 5.2534E−05 | 2.3640E−04 |
| S3 | 2.9507E−01 | −3.0342E−02 | 5.0294E−03 | −1.0733E−03 | −4.0977E−04 | 2.3408E−04 |
| S4 | 3.4633E−03 | −3.8081E−02 | 2.7821E−03 | −1.2985E−03 | 5.2788E−03 | 6.7562E−05 |
| S5 | 9.8515E−02 | 7.2222E−03 | −3.1384E−03 | 3.3151E−03 | −7.4767E−04 | −5.7114E−04 |
| S6 | −2.1153E−01 | 1.3615E−02 | −1.0847E−03 | 3.6659E−03 | −5.4669E−04 | 3.3462E−05 |
| S7 | −2.7049E−01 | −2.2021E−02 | −4.3569E−03 | 1.6420E−03 | 1.0251E−04 | −4.4582E−05 |
| S8 | −2.2637E−01 | −2.5656E−02 | 2.2593E−03 | 6.2832E−04 | 1.1827E−04 | −1.7135E−04 |
| S9 | −1.7434E−01 | −2.9802E−02 | −2.7805E−03 | −3.1195E−03 | −1.8403E−04 | −2.0418E−04 |
| S10 | −2.0064E−01 | −6.6472E−02 | 1.2567E−02 | −3.9607E−03 | 5.7452E−03 | 9.7048E−04 |
| S11 | −4.5768E−01 | 7.2326E−03 | 3.2782E−02 | −8.6825E−04 | 7.2229E−03 | 8.3618E−04 |
| S12 | −7.3781E−01 | 8.0612E−02 | 1.3527E−02 | 7.4472E−04 | 2.2373E−03 | −4.2024E−04 |

TABLE 2-2

| Surface number | A16 | A18 | A20 | A22 | A24 |
|---|---|---|---|---|---|
| S1 | −9.1716E−06 | 1.6981E−07 | 3.5952E−07 | 0.0000E+00 | 0.0000E+00 |
| S2 | −3.7132E−06 | 3.4671E−05 | −2.1290E−05 | 0.0000E+00 | 0.0000E+00 |
| S3 | 1.0114E−05 | −7.0900E−06 | 6.9828E−06 | 0.0000E+00 | 0.0000E+00 |
| S4 | −8.1272E−04 | 1.9144E−06 | 6.3543E−06 | 0.0000E+00 | 0.0000E+00 |
| S5 | 1.9984E−04 | 1.3565E−05 | 9.6781E−07 | 0.0000E+00 | 0.0000E+00 |
| S6 | 2.7883E−05 | −7.5351E−06 | −3.4401E−07 | 0.0000E+00 | 0.0000E+00 |
| S7 | −2.1419E−05 | 5.6478E−07 | 9.5975E−07 | 0.0000E+00 | 0.0000E+00 |
| S8 | 1.5411E−05 | 5.3153E−06 | −1.4471E−06 | 0.0000E+00 | 0.0000E+00 |
| S9 | −1.4422E−04 | −7.8402E−05 | −3.0248E−05 | 0.0000E+00 | 0.0000E+00 |
| S10 | 5.7471E−05 | −3.7122E−04 | −1.0166E−04 | 0.0000E+00 | 0.0000E+00 |
| S11 | −2.1235E−05 | −5.7378E−04 | −9.9083E−05 | 2.0579E−05 | 1.0606E−05 |
| S12 | 1.7787E−04 | −7.3681E−05 | 1.1481E−04 | 3.3046E−05 | 1.7007E−05 |

Figure 3A:
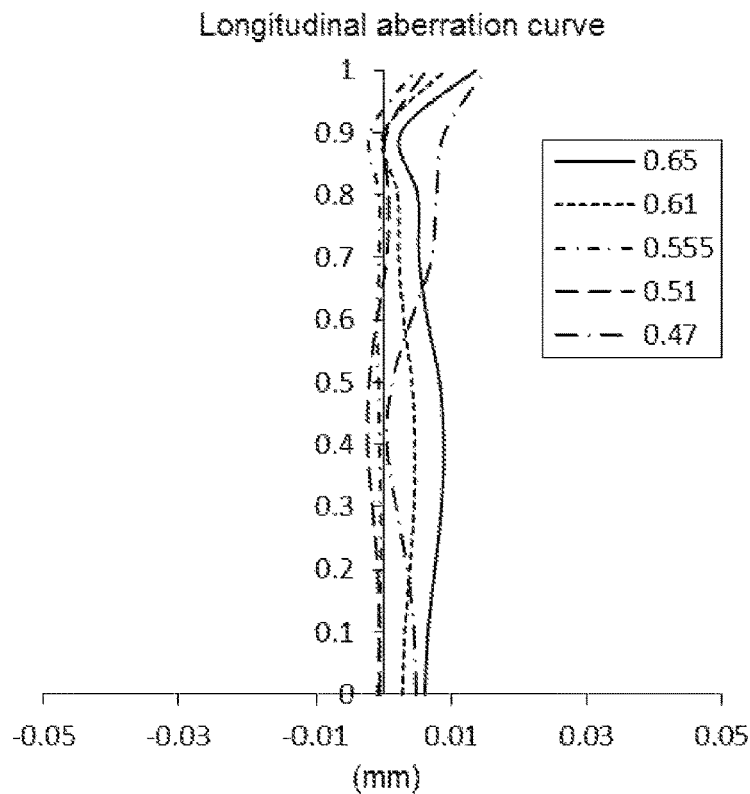
FIG. 3A to FIG. 3C show a longitudinal aberration curve, an astigmatism curve and a distortion curve of an imaging lens assembly of which a movable diaphragm is at a minimum distance from an imaging surface of the imaging lens assembly on an optical axis according to embodiment 1 respectively.
Figure 3B:
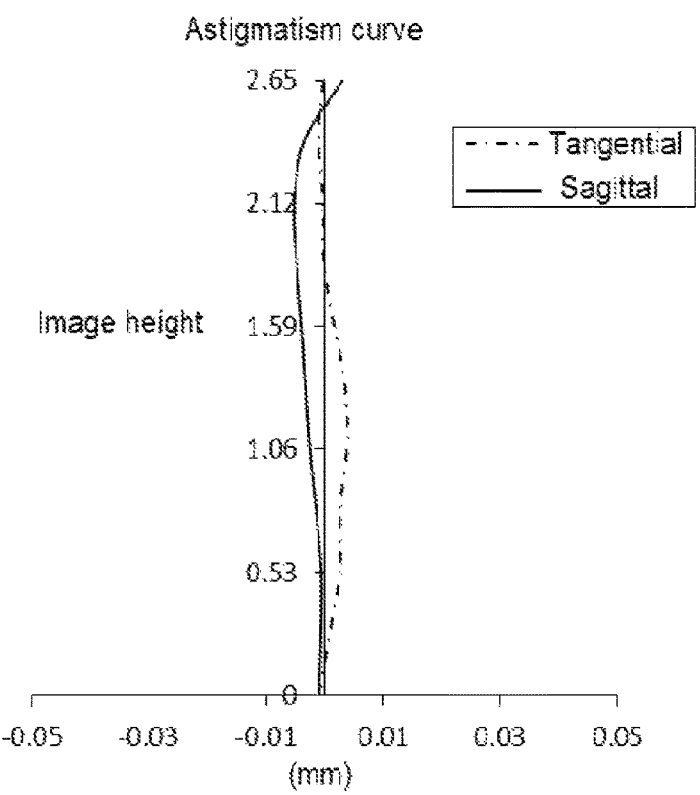
Figure 3C:
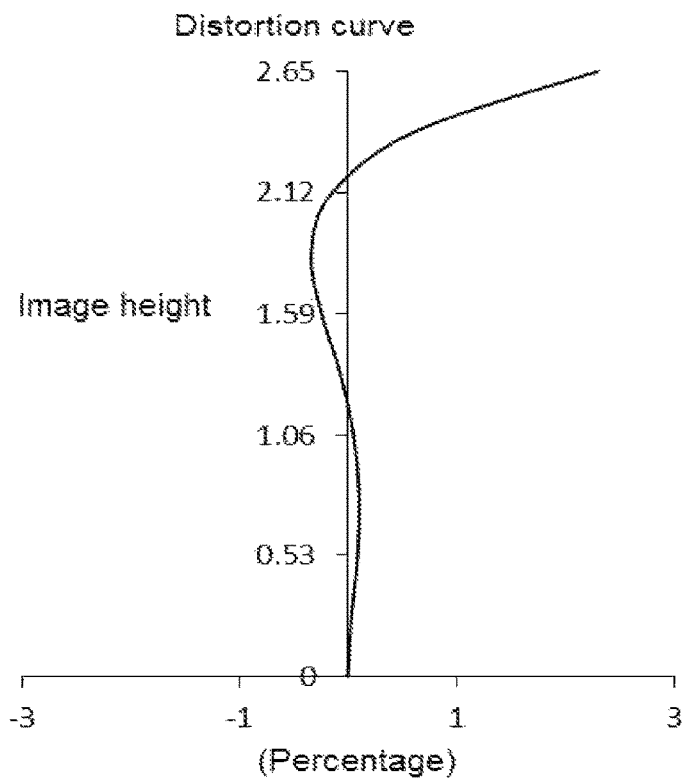
Figure 4A:
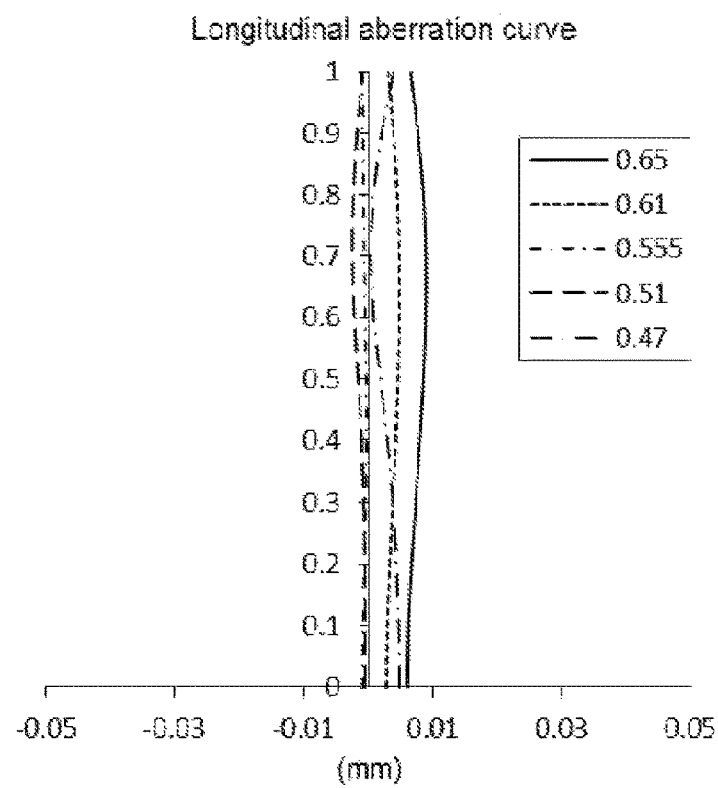
FIG. 4A to FIG. 4C show a longitudinal aberration curve, an astigmatism curve and a distortion curve of an imaging lens assembly of which a movable diaphragm is at a maximum distance from an imaging surface of the imaging lens assembly on an optical axis according to embodiment 1 respectively.
Figure 4B:
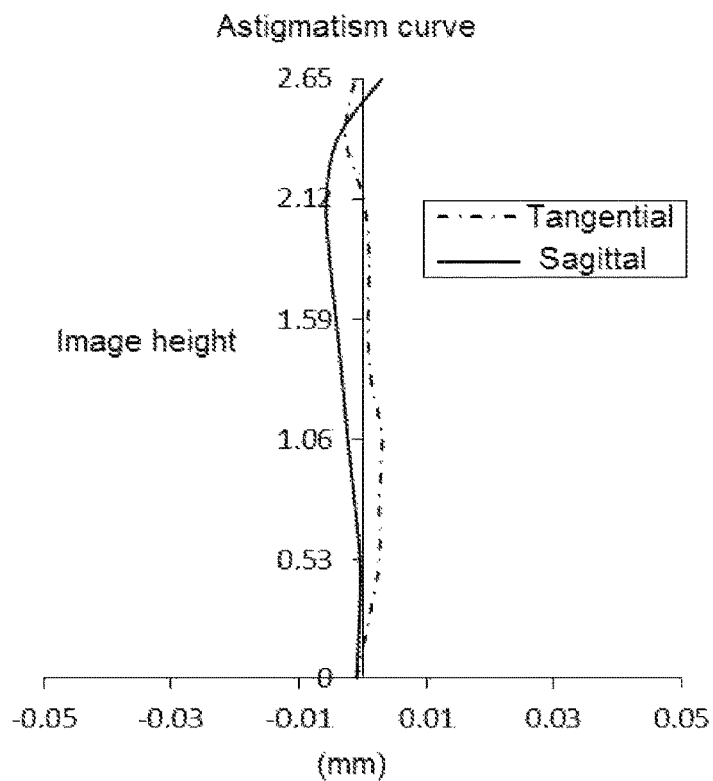
Figure 4C:
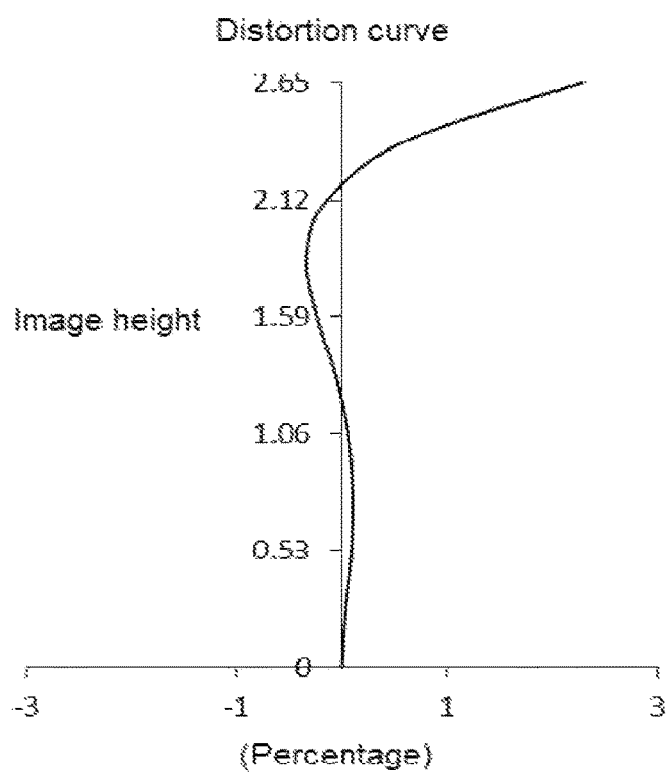

FIG. 3A and FIG. 4A show longitudinal aberration curves of the imaging lens assembly of which the movable diaphragm is at the maximum distance and the maximum distance from the imaging surface of the imaging lens assembly on the optical axis according to embodiment 1 respectively to represent deviation of a convergence focal point after light with different wavelengths passes through the lens. FIG. 3B and FIG. 4B show astigmatism curves of the imaging lens assembly of which the movable diaphragm is at the maximum distance and the maximum distance from the imaging surface of the imaging lens assembly on the optical axis according to embodiment 1 respectively to represent a meridian image surface curvature and a sagittal image surface curvature. FIG. 3C and FIG. 4C show distortion curves of the imaging lens assembly of which the movable diaphragm is at the maximum distance and the maximum distance from the imaging surface of the imaging lens assembly on the optical axis according to embodiment 1 respectively to represent distortion values corresponding to different image heights. According to FIG. 3A to FIG. 4C, it can be seen that the imaging lens assembly provided in embodiment 1 may achieve high imaging quality.

Embodiment 2

Figure 5:
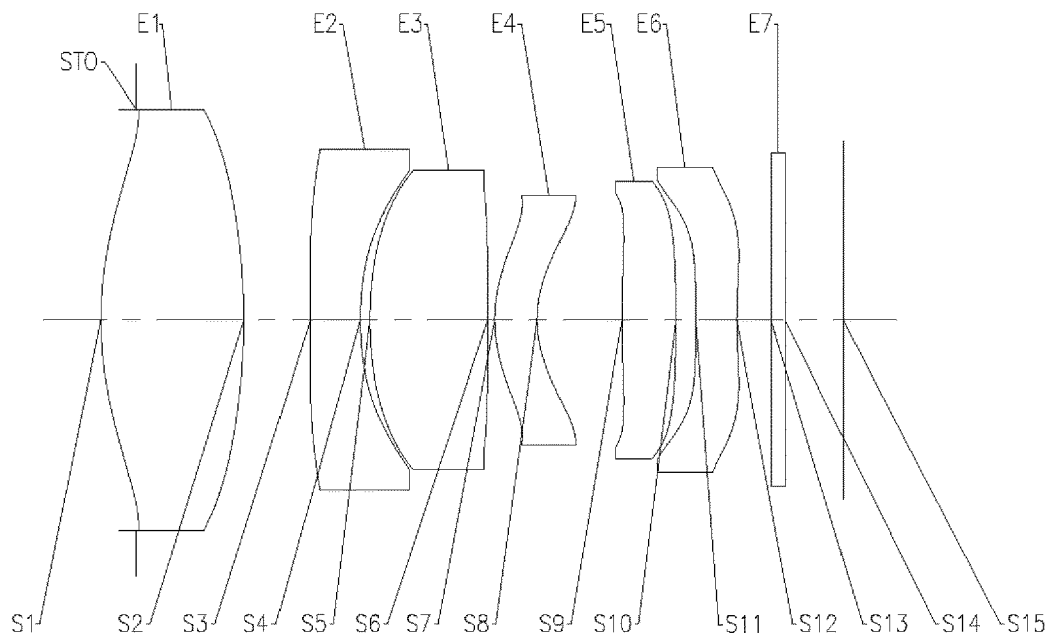
FIG. 5 shows a structure diagram of an imaging lens assembly according to embodiment 2 of the disclosure, a movable diaphragm being at a minimum distance from an imaging surface of the imaging lens assembly.
Figure 6:
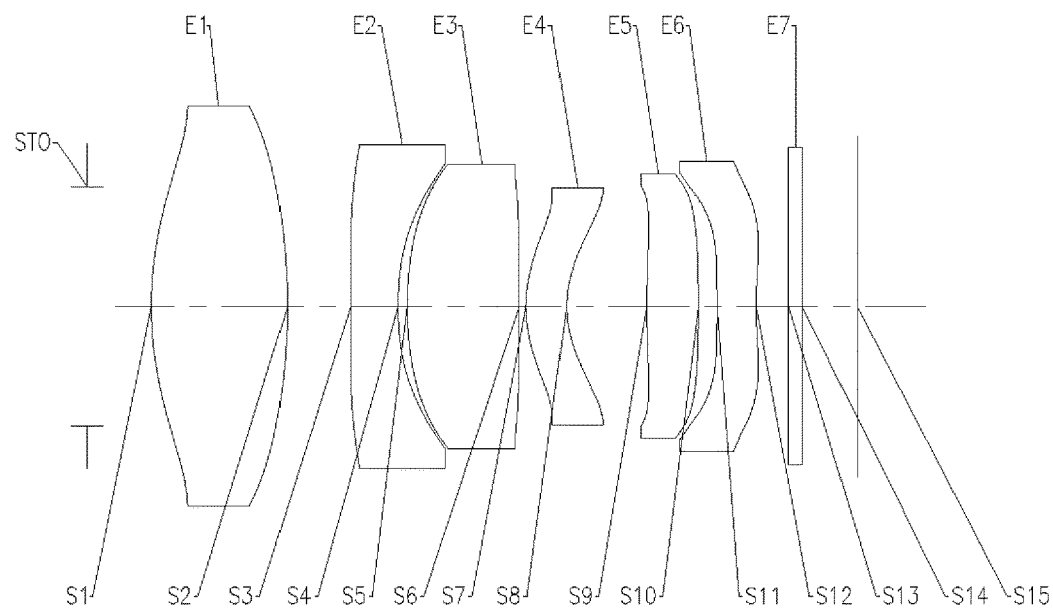
FIG. 6 shows a structure diagram of an imaging lens assembly according to embodiment 2 of the disclosure, a movable diaphragm being at a maximum distance from an imaging surface of the imaging lens assembly.

An imaging lens assembly according to embodiment 2 of the disclosure will be described below with reference to FIG. 5 to FIG. 8C. In the embodiment and the following embodiments, part of descriptions similar to those about embodiment is omitted for simplicity. FIG. 5 and FIG. 6 are structure diagrams of an imaging lens assembly of which a movable diaphragm is at a minimum distance and a maximum distance from an imaging surface of the imaging lens assembly according to embodiment 2 of the disclosure respectively.

As shown in FIG. 5 and FIG. 6, the imaging lens assembly sequentially includes, from an object side to an image side, a movable diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the imaging lens assembly is 9.12 mm, TSmin is a distance from the movable diaphragm at the minimum distance from the imaging surface of the imaging lens assembly to the object-side surface of the first lens on an optical axis, a value of TSmin is −0.5197 mm, TSmax is a distance from the movable diaphragm at the maximum distance from the imaging surface of the imaging lens assembly to the object-side surface of the first lens on the optical axis, a value of TSmax is 1.0000 mm, an f-number FNOmin of the imaging lens assembly when the distance from the movable diaphragm to the imaging surface of the imaging lens assembly on the optical axis is minimum is 1.46, an f-number FNOmax of the imaging lens assembly when the distance from the movable diaphragm to the imaging surface of the imaging lens assembly on the optical axis is maximum is 2.45, and a maximum field of view of the imaging lens assembly is 31.8°.

Table 3 shows a basic parameter table of the imaging lens assembly of embodiment 2, and units of the curvature radius, the thickness/distance and the focal length are all mm. Tables 4-1 and Table 4-2 show high-order coefficients that can be used for each of aspheric mirror surfaces in embodiment 2. A surface type of each aspheric surface may be defined by formula (1) given in embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspheric | 5.5420 | 2.1161 | 1.546 | 56.14 | 6.68 | 0.1636 |
| S2 | Aspheric | −8.5646 | 0.9812 | | | | 0.0000 |
| S3 | Aspheric | −25.3357 | 0.7370 | 1.645 | 23.53 | −6.01 | 73.8853 |
| S4 | Aspheric | 3.6989 | 0.1427 | | | | 0.0000 |
| S5 | Aspheric | 5.6329 | 1.7416 | 1.546 | 56.14 | 10.67 | 2.8903 |
| S6 | Aspheric | 154.1801 | 0.1053 | | | | 91.4382 |
| S7 | Aspheric | 2.1141 | 0.6285 | 1.546 | 56.14 | −46.06 | −1.5961 |
| S8 | Aspheric | 1.7454 | 1.2471 | | | | −1.4093 |
| S9 | Aspheric | 19.3213 | 0.8035 | 1.667 | 20.37 | 11.22 | 19.1328 |
| S10 | Aspheric | −12.0167 | 0.2905 | | | | −78.7642 |
| S11 | Spherical | −21.3086 | 0.6075 | 1.546 | 56.14 | −9.21 | 86.2067 |
| S12 | Spherical | 7.6527 | 0.5049 | | | | −19.0319 |
| S13 | Spherical | Infinite | 0.2100 | 1.518 | 64.17 | | |
| S14 | Spherical | Infinite | 0.8529 | | | | |
| S15 | Spherical | Infinite | | | | | |

TABLE 4-1

| Surface number | A4 | A6 | A8 | A10 | A12 | A14 |
|---|---|---|---|---|---|---|
| S1 | −3.7038E−01 | −3.9918E−02 | −2.1209E−03 | 3.7230E−05 | −1.2310E−04 | −4.6774E−05 |
| S2 | 1.6970E−01 | −3.0156E−02 | −3.4080E−03 | −3.9047E−03 | −4.7069E−04 | −3.5874E−05 |
| S3 | 3.0747E−01 | −3.9222E−02 | 9.8216E−03 | −2.2953E−03 | 2.8943E−04 | −8.5802E−05 |
| S4 | −3.2535E−03 | −3.7768E−02 | 1.6055E−03 | −5.6375E−03 | 4.6459E−03 | −2.7768E−04 |
| S5 | 1.0034E−01 | 3.9525E−03 | −2.5855E−03 | 1.5234E−03 | −6.6239E−04 | −8.2196E−04 |
| S6 | −1.2309E−01 | 1.8267E−02 | 4.3665E−03 | 1.7660E−03 | −3.3631E−05 | −6.7724E−05 |
| S7 | −2.6892E−01 | −2.0168E−02 | −3.4596E−03 | 1.6675E−03 | 1.3048E−04 | −1.3844E−04 |
| S8 | −2.4727E−01 | −1.8768E−02 | 2.2589E−04 | 8.8321E−04 | 1.3229E−04 | −2.2236E−04 |
| S9 | −1.4528E−01 | −3.6756E−02 | −6.4606E−03 | −3.4805E−03 | −1.4848E−04 | −3.8045E−04 |
| S10 | −1.9798E−01 | −6.8056E−02 | 8.7825E−03 | −9.4728E−04 | 6.4738E−03 | 3.1949E−04 |
| S11 | −4.8322E−01 | 7.8076E−03 | 3.2633E−02 | 8.1566E−04 | 7.3974E−03 | −1.9857E−04 |
| S12 | −7.0686E−01 | 6.9888E−02 | 1.7671E−02 | 4.0930E−05 | 2.5749E−03 | −7.6125E−04 |

TABLE 4-2

| Surface number | A16 | A18 | A20 | A22 | A24 |
|---|---|---|---|---|---|
| S1 | −1.8970E−06 | 7.8823E−07 | −1.6860E−06 | 0.0000E+00 | 0.0000E+00 |
| S2 | 9.7270E−06 | −2.2678E−05 | −1.5540E−05 | 0.0000E+00 | 0.0000E+00 |
| S3 | 7.9814E−05 | −3.4805E−05 | 7.7374E−06 | 0.0000E+00 | 0.0000E+00 |
| S4 | −1.4145E−03 | −5.1891E−06 | 8.1529E−06 | 0.0000E+00 | 0.0000E+00 |
| S5 | 3.0417E−04 | 3.6551E−05 | −1.7045E−06 | 0.0000E+00 | 0.0000E+00 |
| S6 | 5.5541E−05 | 3.5194E−05 | 6.9439E−05 | 0.0000E+00 | 0.0000E+00 |
| S7 | −8.2663E−07 | −4.4385E−07 | 1.4829E−07 | 0.0000E+00 | 0.0000E+00 |
| S8 | 2.7804E−05 | 3.2029E−06 | −3.2401E−06 | 0.0000E+00 | 0.0000E+00 |
| S9 | −2.4336E−04 | −1.1509E−04 | −3.6009E−05 | 0.0000E+00 | 0.0000E+00 |
| S10 | −1.1979E−04 | −2.9500E−04 | −1.9790E−05 | 0.0000E+00 | 0.0000E+00 |
| S11 | −3.2966E−04 | −4.9120E−04 | −8.5065E−06 | 1.5207E−05 | −7.4239E−07 |
| S12 | 2.3653E−04 | −7.7119E−05 | 1.1857E−04 | 1.4292E−05 | 9.6955E−06 |

Figure 7A:
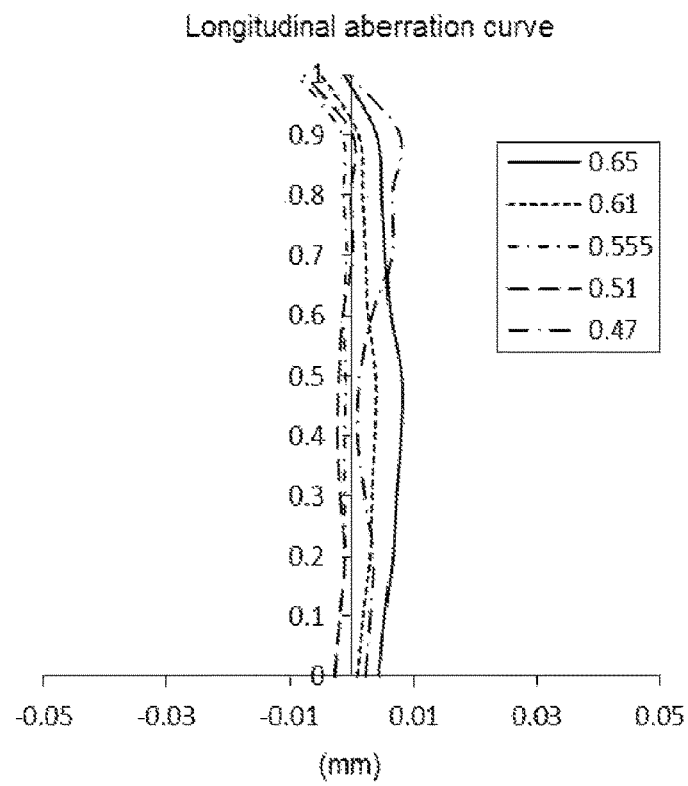
FIG. 7A to FIG. 7C show a longitudinal aberration curve, an astigmatism curve and a distortion curve of an imaging lens assembly of which a movable diaphragm is at a minimum distance from an imaging surface of the imaging lens assembly on an optical axis according to embodiment 2 respectively.
Figure 7B:
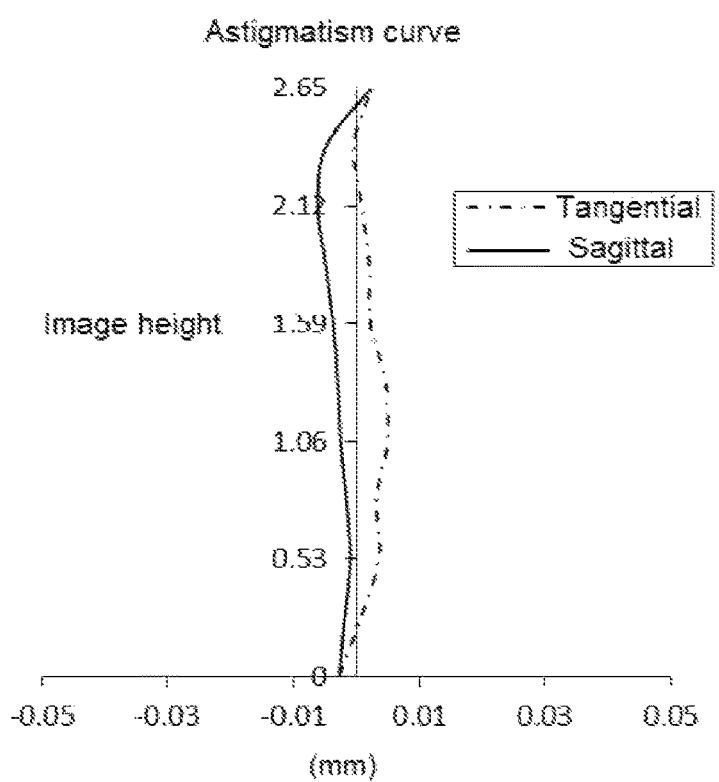
Figure 7C:
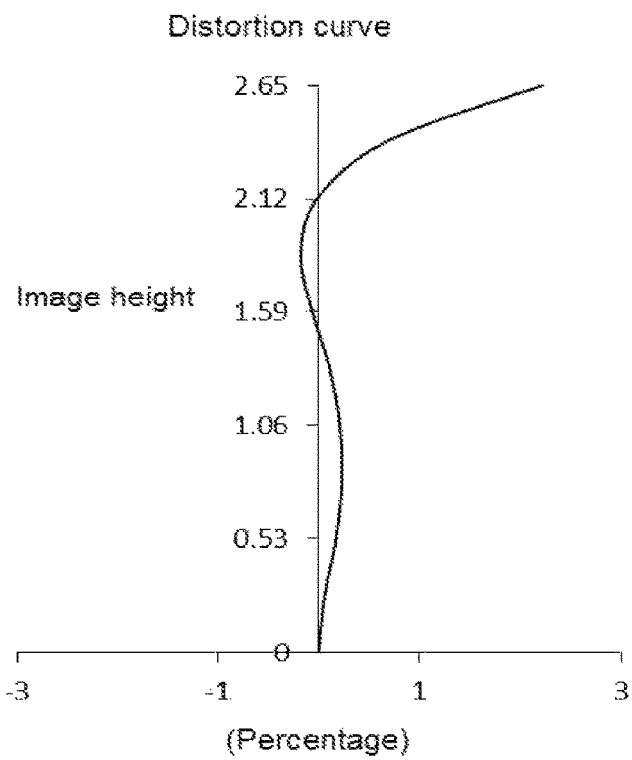
Figure 8A:
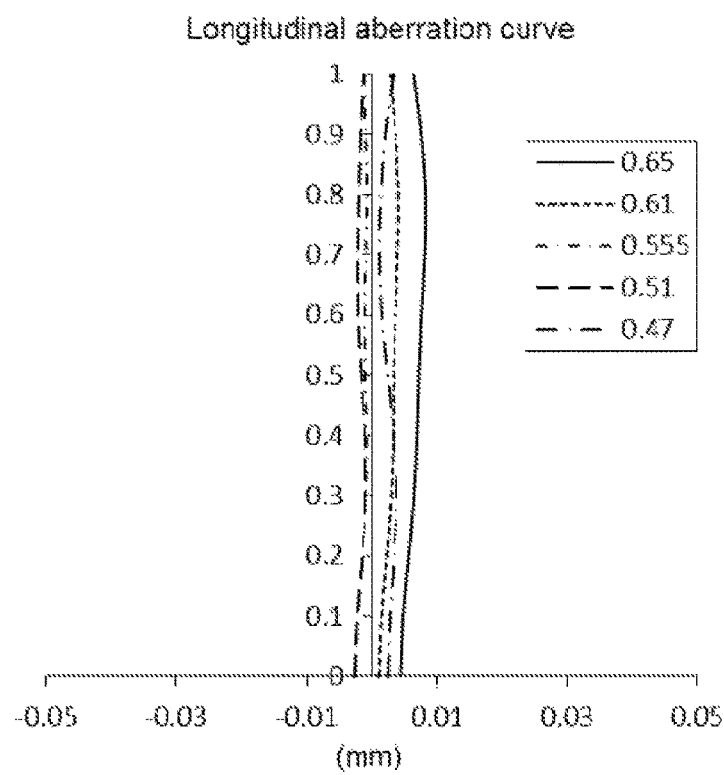
FIG. 8A to FIG. 8C show a longitudinal aberration curve, an astigmatism curve and a distortion curve of an imaging lens assembly of which a movable diaphragm is at a maximum distance from an imaging surface of the imaging lens assembly on an optical axis according to embodiment 2 respectively.
Figure 8B:
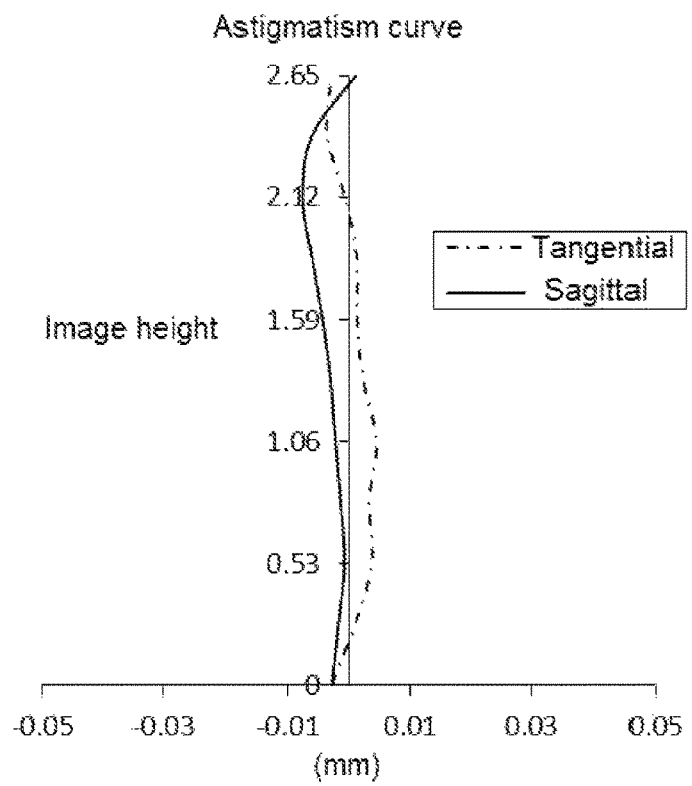
Figure 8C:
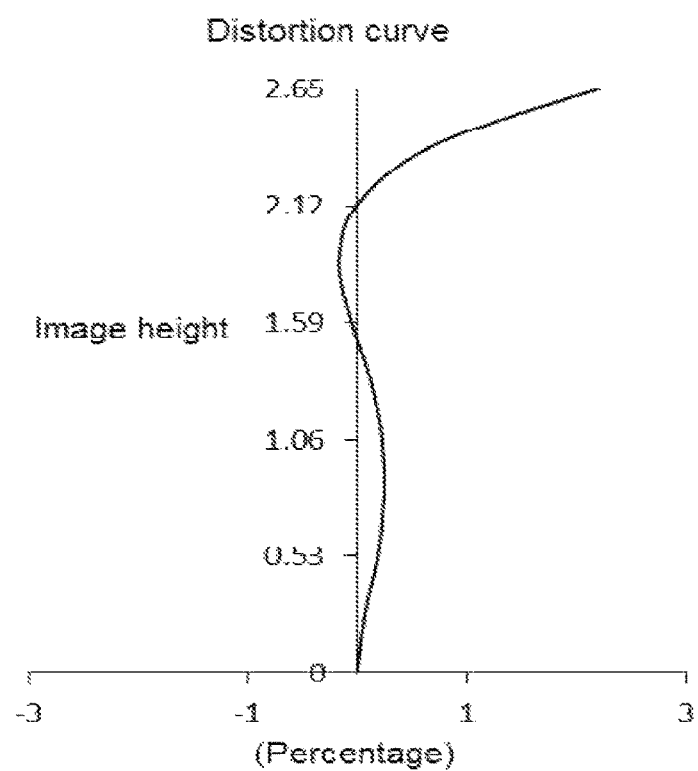

FIG. 7A and FIG. 8A show longitudinal aberration curves of the imaging lens assembly of which the movable diaphragm is at the maximum distance and the maximum distance from the imaging surface of the imaging lens assembly on the optical axis according to embodiment 2 respectively to represent deviation of a convergence focal point after light with different wavelengths passes through the lens. FIG. 7B and FIG. 8B show astigmatism curves of the imaging lens assembly of which the movable diaphragm is at the maximum distance and the maximum distance from the imaging surface of the imaging lens assembly on the optical axis according to embodiment 2 respectively to represent a meridian image surface curvature and a sagittal image surface curvature. FIG. 7C and FIG. 8C show distortion curves of the imaging lens assembly of which the movable diaphragm is at the maximum distance and the maximum distance from the imaging surface of the imaging lens assembly on the optical axis according to embodiment 2 respectively to represent distortion values corresponding to different image heights. According to FIG. 7A to FIG. 8C, it can be seen that the imaging lens assembly provided in embodiment 2 may achieve high imaging quality.

Embodiment 3

Figure 9:
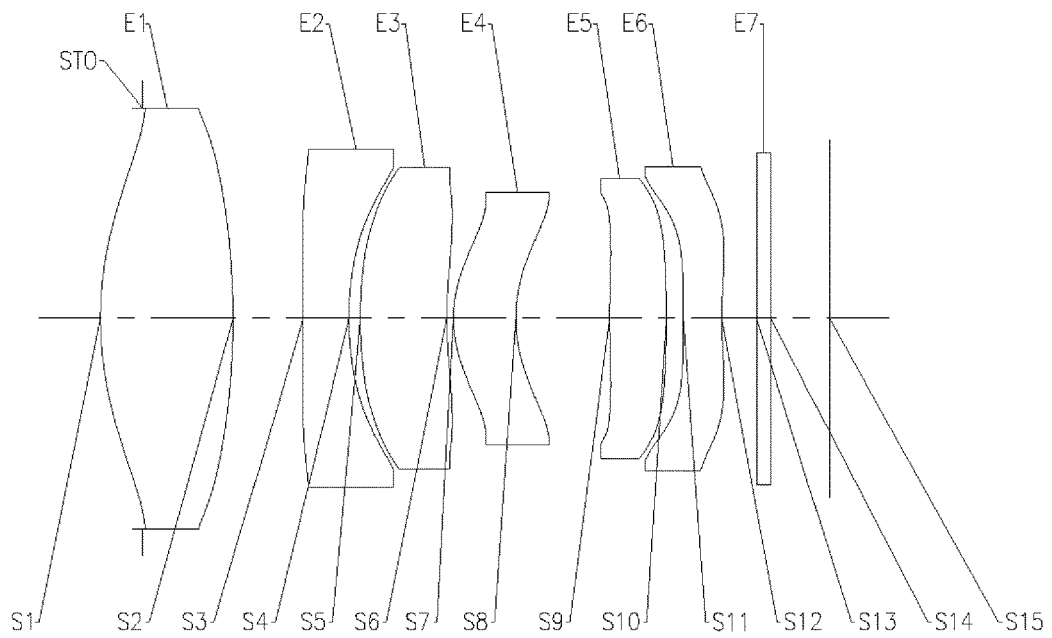
FIG. 9 shows a structure diagram of an imaging lens assembly according to embodiment 3 of the disclosure, a movable diaphragm being at a minimum distance from an imaging surface of the imaging lens assembly.
Figure 10:
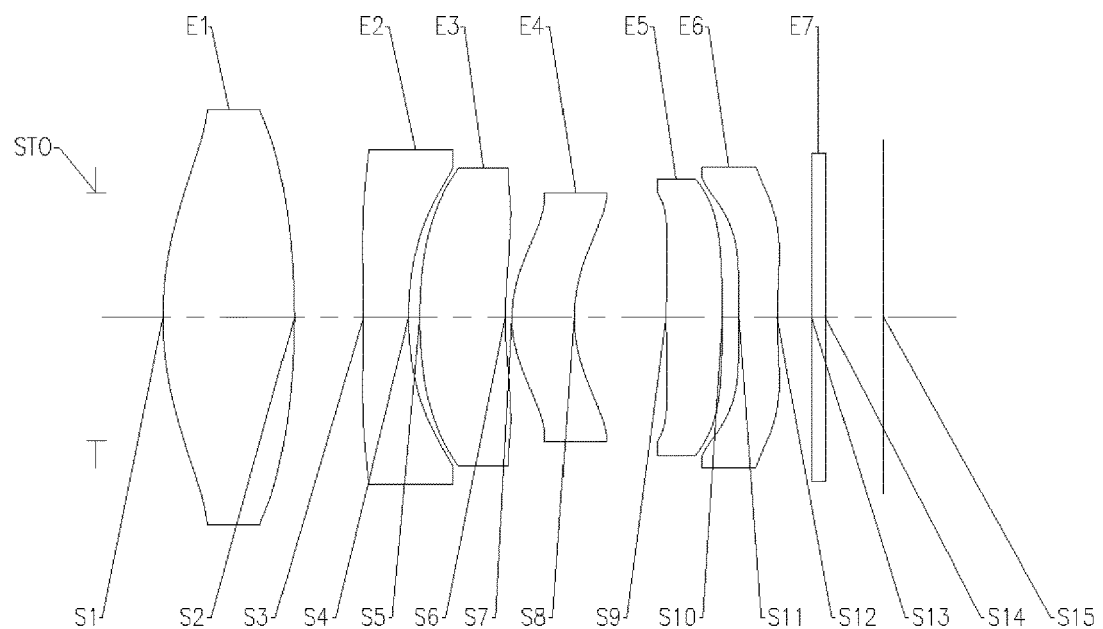
FIG. 10 shows a structure diagram of an imaging lens assembly according to embodiment 3 of the disclosure, a movable diaphragm being at a maximum distance from an imaging surface of the imaging lens assembly.

An imaging lens assembly according to embodiment 3 of the disclosure will be described below with reference to FIG. 9 to FIG. 12C. FIG. 9 and FIG. 10 are structure diagrams of an imaging lens assembly of which a movable diaphragm is at a minimum distance and a maximum distance from an imaging surface of the imaging lens assembly according to embodiment 3 of the disclosure respectively.

As shown in FIG. 9 and FIG. 10, the imaging lens assembly sequentially includes, from an object side to an image side, a movable diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the imaging lens assembly is 9.12 mm, TSmin is a distance from the movable diaphragm at the minimum distance from the imaging surface of the imaging lens assembly to the object-side surface of the first lens on an optical axis, a value of TSmin is −0.6206 mm, TSmax is a distance from the movable diaphragm at the maximum distance from the imaging surface of the imaging lens assembly to the object-side surface of the first lens on the optical axis, a value of TSmax is 1.0000 mm, an f-number FNOmin of the imaging lens assembly when the distance from the movable diaphragm to the imaging surface of the imaging lens assembly on the optical axis is minimum is 1.46, an f-number FNOmax of the imaging lens assembly when the distance from the movable diaphragm to the imaging surface of the imaging lens assembly on the optical axis is maximum is 2.45, and a maximum field of view of the imaging lens assembly is 31.7°.

Table 5 shows a basic parameter table of the imaging lens assembly of embodiment 3, and units of the curvature radius, the thickness/distance and the focal length are all mm. Tables 6-1 and Table 6-2 show high-order coefficients that can be used for each of aspheric mirror surfaces in embodiment 3. A surface type of each aspheric surface may be defined by formula (1) given in embodiment 1.

TABLE 5

| Surface number | Surface type | Curvature radius | Thickness/distance | Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspheric | 5.1024 | 1.9682 | 1.546 | 56.14 | 6.70 | 0.1531 |
| S2 | Aspheric | −11.1737 | 1.0339 | | | | 0.0000 |
| S3 | Aspheric | −23.2042 | 0.6766 | 1.645 | 23.53 | −5.98 | 67.4546 |
| S4 | Aspheric | 4.6741 | 0.1694 | | | | 0.0000 |
| S5 | Aspheric | 6.9053 | 1.2803 | 1.546 | 56.14 | −75.30 | 3.4987 |
| S6 | Aspheric | 5.5250 | 0.1000 | | | | −5.4169 |
| S7 | Aspheric | 1.7427 | 0.9276 | 1.546 | 56.14 | 8.78 | −1.7608 |
| S8 | Aspheric | 2.2238 | 1.3800 | | | | −1.0970 |
| S9 | Aspheric | 20.0498 | 0.8452 | 1.667 | 20.37 | 11.25 | −66.1362 |
| S10 | Aspheric | −11.7973 | 0.2504 | | | | −9.6746 |
| S11 | Spherical | −21.2834 | 0.5700 | 1.546 | 56.14 | −10.00 | 87.2684 |
| S12 | Spherical | 7.4100 | 0.5179 | | | | −5.9886 |
| S13 | Spherical | Infinite | 0.2100 | 1.518 | 64.17 | | |
| S14 | Spherical | Infinite | 0.8659 | | | | |
| S15 | Spherical | Infinite | | | | | |

TABLE 6-1

| Surface number | A4 | A6 | A8 | A10 | A12 | A14 |
|---|---|---|---|---|---|---|
| S1 | −3.7361E−01 | −4.2380E−02 | −1.9816E−03 | 1.1846E−04 | −1.5971E−04 | −8.0710E−05 |
| S2 | −5.4021E−02 | −2.6771E−02 | 2.9857E−03 | −1.1190E−03 | −1.4470E−04 | 5.0559E−05 |
| S3 | 2.9779E−01 | −2.6772E−02 | 3.0043E−03 | −1.0421E−03 | −5.9406E−04 | 3.0350E−04 |
| S4 | 1.0706E−01 | −9.6716E−03 | −4.9688E−03 | 2.3642E−03 | −9.6190E−04 | −3.5402E−04 |
| S5 | 1.3181E−01 | −3.4880E−03 | −5.7783E−04 | 2.7373E−03 | −1.3433E−04 | −5.7838E−04 |
| S6 | −2.5504E−01 | 2.0547E−02 | −4.8409E−03 | 2.1439E−03 | −1.4518E−04 | −2.6647E−05 |
| S7 | −2.8517E−01 | −1.2469E−02 | −5.4882E−03 | 1.6654E−03 | 1.8539E−05 | 1.1550E−05 |
| S8 | −2.0933E−01 | −2.8592E−02 | 2.7639E−03 | 1.8727E−04 | 7.5749E−05 | −1.2335E−04 |
| S9 | −1.7817E−01 | −2.9070E−02 | −5.0120E−03 | −4.2660E−03 | −6.8980E−04 | −3.4411E−04 |
| S10 | −1.9466E−01 | −6.0565E−02 | 1.3074E−02 | −4.3959E−03 | 6.2896E−03 | 8.7497E−04 |
| S11 | −4.5738E−01 | 6.2157E−03 | 3.4490E−02 | −2.7977E−03 | 7.1633E−03 | 3.6449E−04 |
| S12 | −7.3360E−01 | 7.6355E−02 | 1.8267E−02 | 3.6361E−04 | 3.2350E−03 | −6.3116E−04 |

TABLE 6-2

| Surface number | A16 | A18 | A20 | A22 | A24 |
|---|---|---|---|---|---|
| S1 | −6.6475E−06 | 1.2847E−06 | 4.9033E−07 | 0.0000E+00 | 0.0000E+00 |
| S2 | −4.9244E−06 | −3.2886E−07 | 3.1823E−06 | 0.0000E+00 | 0.0000E+00 |
| S3 | −2.4269E−05 | −1.0772E−06 | 4.1161E−06 | 0.0000E+00 | 0.0000E+00 |
| S4 | 1.4134E−04 | 7.7947E−06 | −5.9553E−07 | 0.0000E+00 | 0.0000E+00 |
| S5 | 1.5955E−04 | 5.2138E−06 | 1.7959E−06 | 0.0000E+00 | 0.0000E+00 |
| S6 | 1.1196E−05 | 1.2511E−06 | 1.9908E−07 | 0.0000E+00 | 0.0000E+00 |
| S7 | −2.9525E−05 | 2.2392E−06 | 5.1105E−07 | 0.0000E+00 | 0.0000E+00 |
| S8 | −1.6083E−06 | 8.3802E−06 | −6.4194E−07 | 0.0000E+00 | 0.0000E+00 |
| S9 | −1.6205E−04 | −8.0124E−05 | −2.6551E−05 | 0.0000E+00 | 0.0000E+00 |
| S10 | −5.2009E−06 | −4.7076E−04 | −9.2192E−05 | 0.0000E+00 | 0.0000E+00 |
| S11 | −1.2422E−04 | −6.6083E−04 | −6.9829E−05 | 4.0607E−05 | 1.8513E−05 |
| S12 | 2.5029E−04 | −1.5227E−04 | 1.4951E−04 | 3.0689E−05 | 3.1842E−05 |

Figure 11A:
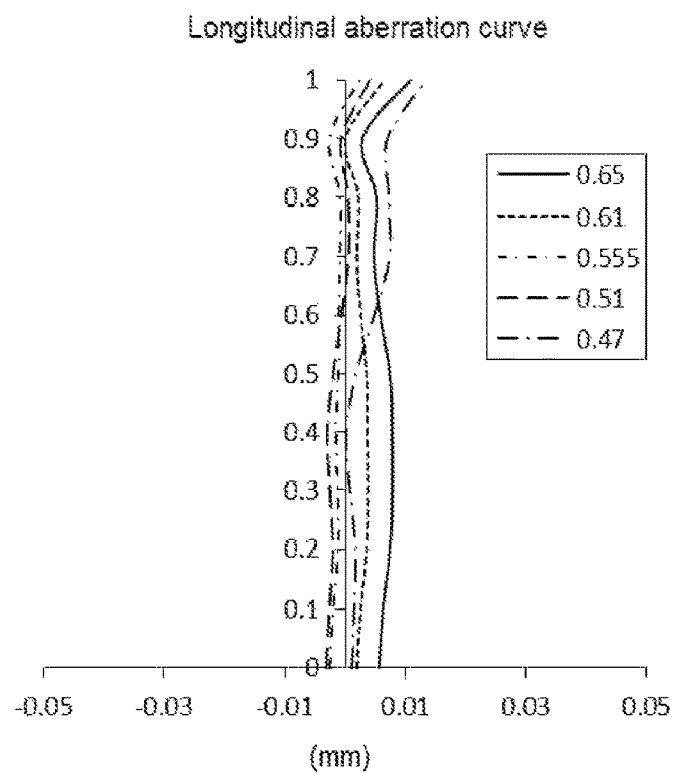
FIG. 11A to FIG. 11C show a longitudinal aberration curve, an astigmatism curve and a distortion curve of an imaging lens assembly of which a movable diaphragm is at a minimum distance from an imaging surface of the imaging lens assembly on an optical axis according to embodiment 3 respectively.
Figure 11B:
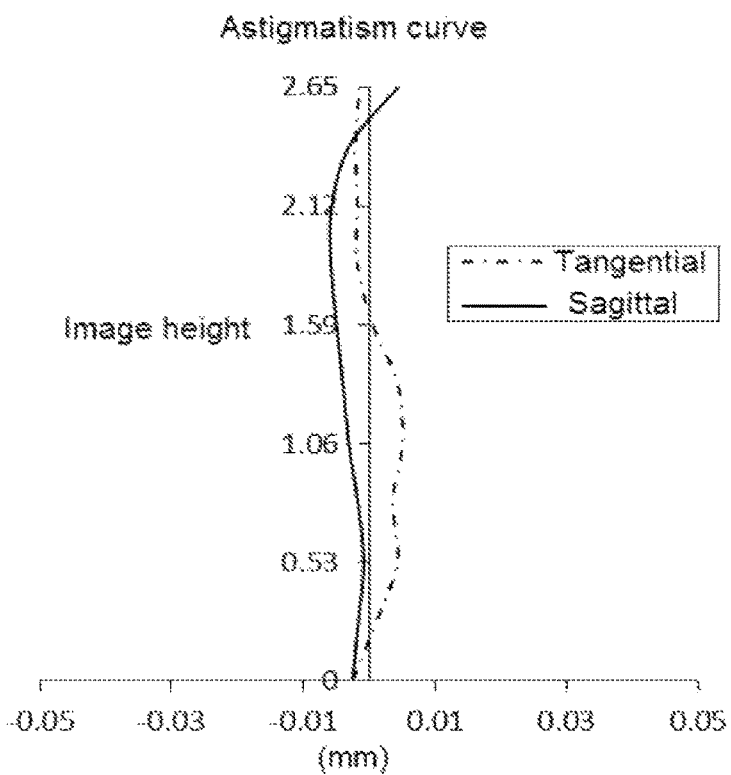
Figure 11C:
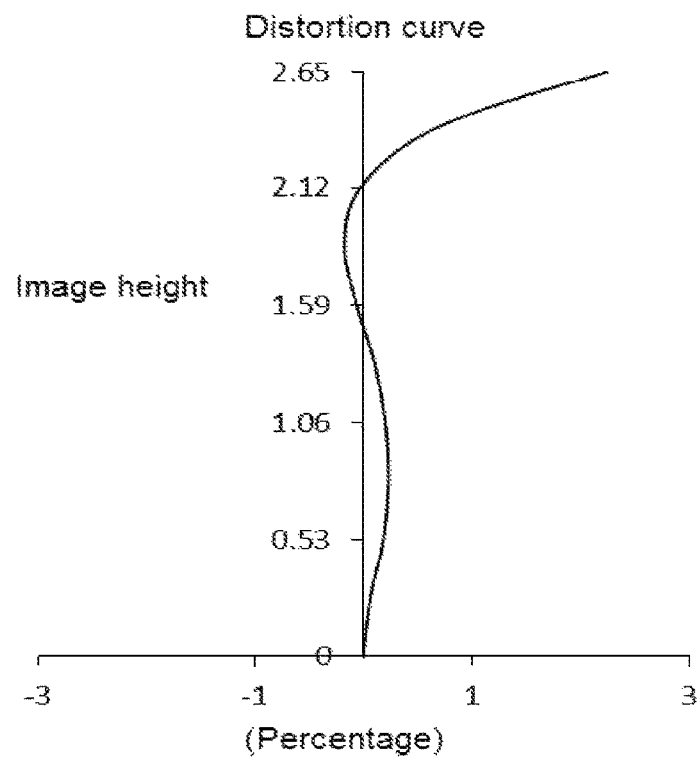
Figure 12A:
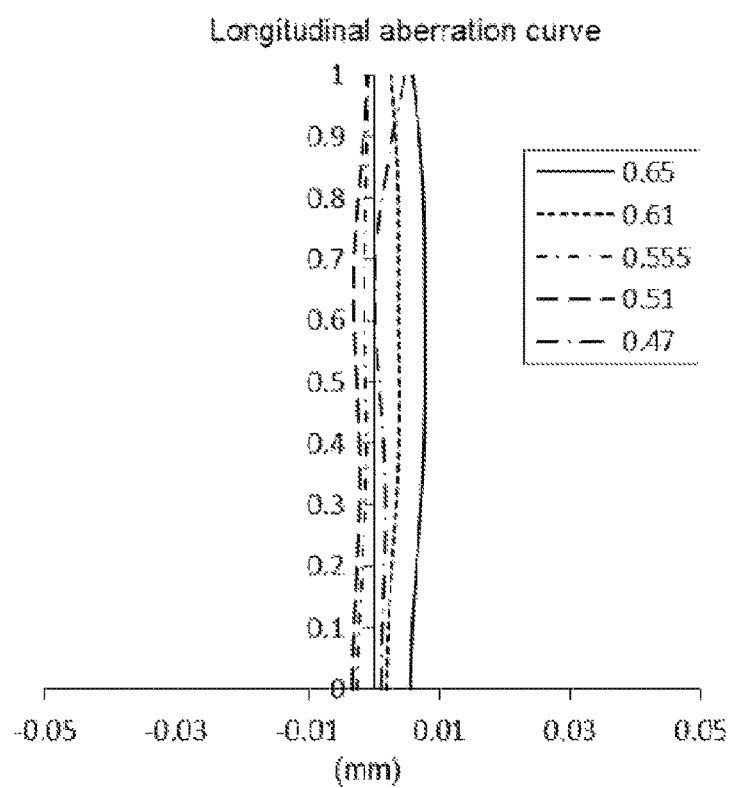
FIG. 12A to FIG. 12C show a longitudinal aberration curve, an astigmatism curve and a distortion curve of an imaging lens assembly of which a movable diaphragm is at a maximum distance from an imaging surface of the imaging lens assembly on an optical axis according to embodiment 3 respectively.
Figure 12B:
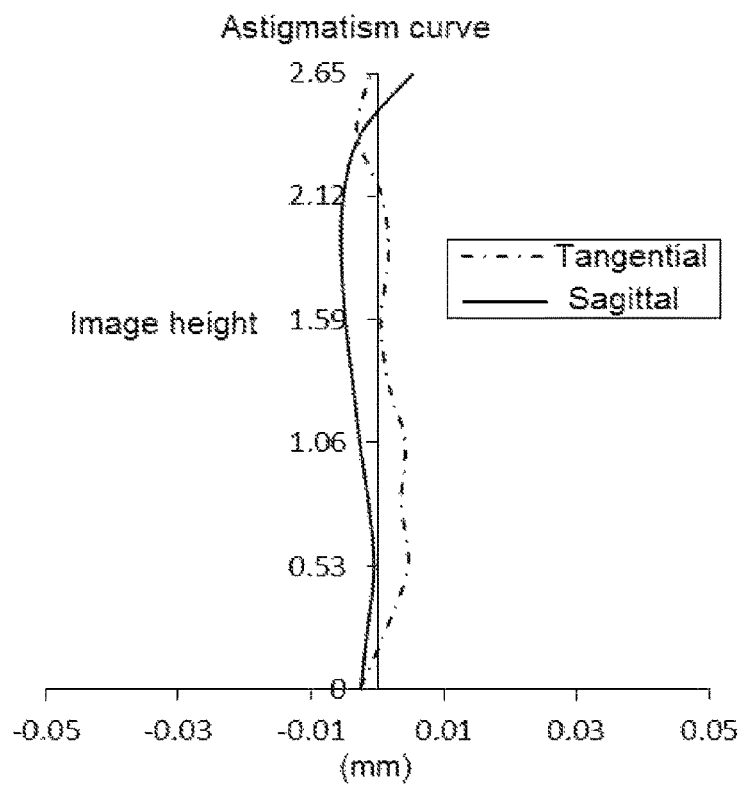
Figure 12C:
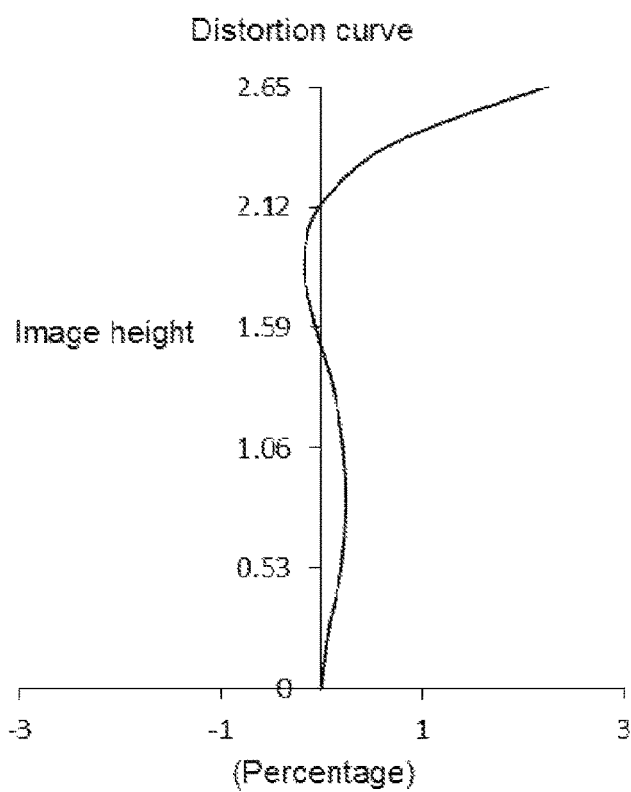

FIG. 11A and FIG. 12A show longitudinal aberration curves of the imaging lens assembly of which the movable diaphragm is at the maximum distance and the maximum distance from the imaging surface of the imaging lens assembly on the optical axis according to embodiment 3 respectively to represent deviation of a convergence focal point after light with different wavelengths passes through the lens. FIG. 11B and FIG. 12B show astigmatism curves of the imaging lens assembly of which the movable diaphragm is at the maximum distance and the maximum distance from the imaging surface of the imaging lens assembly on the optical axis according to embodiment 3 respectively to represent a meridian image surface curvature and a sagittal image surface curvature. FIG. 11C and FIG. 12C show distortion curves of the imaging lens assembly of which the movable diaphragm is at the maximum distance and the maximum distance from the imaging surface of the imaging lens assembly on the optical axis according to embodiment 3 respectively to represent distortion values corresponding to different image heights. According to FIG. 11A to FIG. 12C, it can be seen that the imaging lens assembly provided in embodiment 3 may achieve high imaging quality.

Embodiment 4

Figure 13:
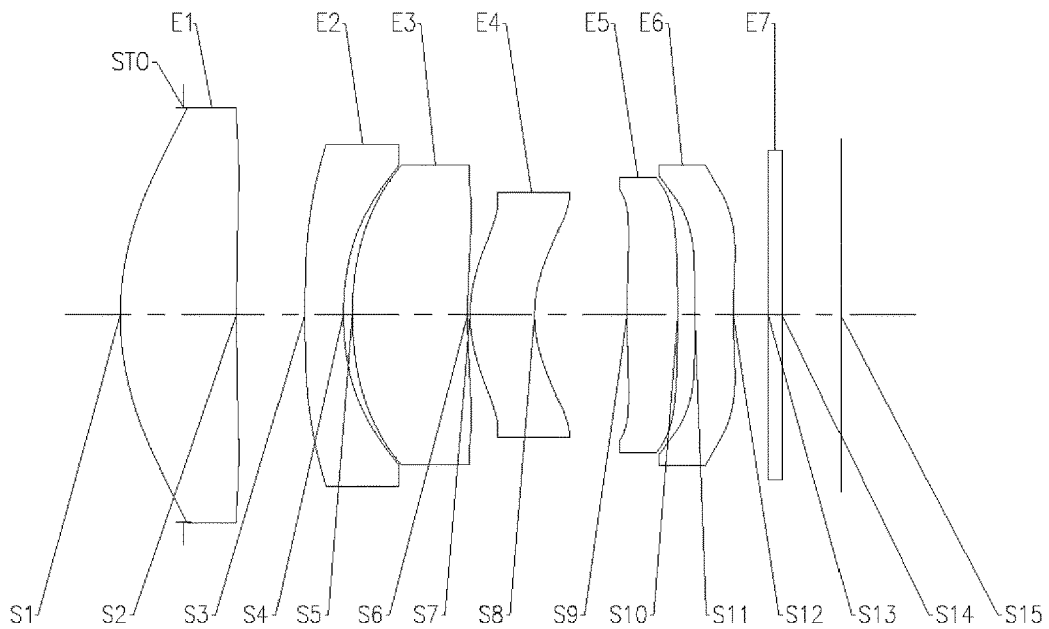
FIG. 13 shows a structure diagram of an imaging lens assembly according to embodiment 4 of the disclosure, a movable diaphragm being at a minimum distance from an imaging surface of the imaging lens assembly.
Figure 14:
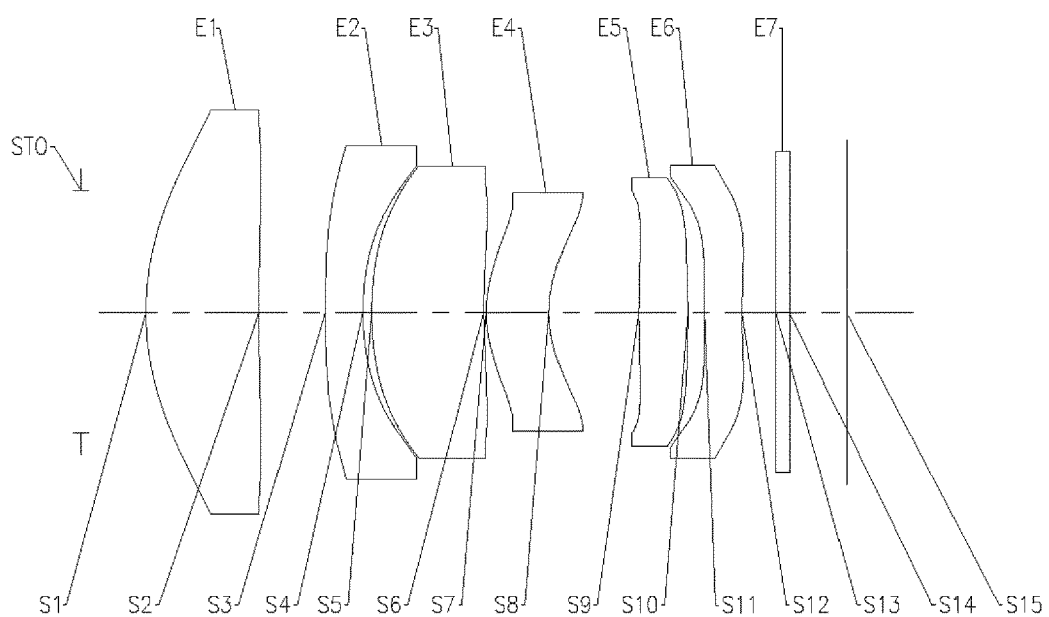
FIG. 14 shows a structure diagram of an imaging lens assembly according to embodiment 4 of the disclosure, a movable diaphragm being at a maximum distance from an imaging surface of the imaging lens assembly.

An imaging lens assembly according to embodiment 4 of the disclosure will be described below with reference to FIG. 13 to FIG. 16C. FIG. 13 and FIG. 14 are structure diagrams of an imaging lens assembly of which a movable diaphragm is at a minimum distance and a maximum distance from an imaging surface of the imaging lens assembly according to embodiment 4 of the disclosure respectively.

As shown in FIG. 13 and FIG. 14, the imaging lens assembly sequentially includes, from an object side to an image side, a movable diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the imaging lens assembly is 9.10 mm, TSmin is a distance from the movable diaphragm at the minimum distance from the imaging surface of the imaging lens assembly to the object-side surface of the first lens on an optical axis, a value of TSmin is −0.9542 mm, TSmax is a distance from the movable diaphragm at the maximum distance from the imaging surface of the imaging lens assembly to the object-side surface of the first lens on the optical axis, a value of TSmax is 1.0000 mm, an f-number FNOmin of the imaging lens assembly when the distance from the movable diaphragm to the imaging surface of the imaging lens assembly on the optical axis is minimum is 1.46, an f-number FNOmax of the imaging lens assembly when the distance from the movable diaphragm to the imaging surface of the imaging lens assembly on the optical axis is maximum is 2.45, and a maximum field of view of the imaging lens assembly is 31.9°.

Table 7 shows a basic parameter table of the imaging lens assembly of embodiment 4, and units of the curvature radius, the thickness/distance and the focal length are all mm. Tables 8-1 and Table 8-2 show high-order coefficients that can be used for each of aspheric mirror surfaces in embodiment 4. A surface type of each aspheric surface may be defined by formula (1) given in embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspheric | 4.3163 | 1.7443 | 1.546 | 56.14 | 8.58 | 0.1982 |
| S2 | Aspheric | 47.3384 | 1.0147 | | | | 90.1273 |
| S3 | Aspheric | 25.3288 | 0.5779 | 1.645 | 23.53 | −7.37 | −68.2035 |
| S4 | Aspheric | 3.9664 | 0.1363 | | | | 0.2775 |
| S5 | Aspheric | 4.8536 | 1.7289 | 1.546 | 56.14 | 14.66 | 2.2527 |
| S6 | Aspheric | 10.7804 | 0.0374 | | | | 6.6502 |
| S7 | Aspheric | 2.0610 | 0.9671 | 1.546 | 56.14 | 33.40 | −1.6059 |
| S8 | Aspheric | 1.9386 | 1.3800 | | | | −1.3301 |
| S9 | Aspheric | 20.2626 | 0.7603 | 1.667 | 20.37 | 11.37 | 18.7635 |
| S10 | Aspheric | −11.9393 | 0.2536 | | | | −99.0000 |
| S11 | Spherical | −21.9239 | 0.5789 | 1.546 | 56.14 | −12.52 | 97.5043 |
| S12 | Spherical | 10.0219 | 0.5228 | | | | −13.5702 |
| S13 | Spherical | Infinite | 0.2100 | 1.518 | 64.17 | | |
| S14 | Spherical | Infinite | 0.8708 | | | | |
| S15 | Spherical | Infinite | | | | | |

TABLE 8-1

| Surface number | A4 | A6 | A8 | A10 | A12 | A14 |
|---|---|---|---|---|---|---|
| S1 | −3.5426E−01 | −4.8876E−02 | −1.6686E−03 | 1.3750E−03 | 2.2800E−04 | −1.6562E−05 |
| S2 | −8.9922E−02 | −1.5905E−02 | 5.5554E−03 | 7.3189E−04 | −2.8726E−04 | 8.0270E−05 |
| S3 | 2.5908E−01 | −3.0790E−02 | 2.5939E−03 | −5.3847E−04 | −1.5406E−03 | 3.6941E−04 |
| S4 | 1.1828E−01 | −7.6560E−03 | −5.1954E−03 | 2.3511E−03 | −3.0733E−04 | −5.1357E−04 |
| S5 | 7.7966E−02 | −1.3911E−02 | −2.6508E−03 | 1.6538E−03 | −3.6266E−04 | −9.8051E−04 |
| S6 | −2.1323E−01 | −2.0296E−04 | 1.1720E−03 | 2.7293E−03 | −2.8205E−04 | −5.2618E−06 |
| S7 | −2.7373E−01 | −1.8241E−02 | −3.8636E−03 | 1.0948E−03 | 7.0142E−05 | −3.9350E−05 |
| S8 | −2.3703E−01 | −2.0831E−02 | 1.9901E−04 | 4.8657E−04 | 1.5489E−05 | −1.0570E−04 |
| S9 | −1.5692E−01 | −3.5712E−02 | −5.2936E−03 | −3.0663E−03 | −1.0865E−04 | −3.0148E−04 |
| S10 | −1.5521E−01 | −7.4719E−02 | 1.0537E−02 | −3.6279E−03 | 6.8600E−03 | 6.2524E−04 |
| S11 | −4.0692E−01 | −2.5249E−02 | 4.1484E−02 | 3.0298E−04 | 1.0229E−02 | 1.6325E−04 |
| S12 | −7.5900E−01 | 5.6048E−02 | 2.9162E−02 | 1.0982E−03 | 4.6958E−03 | −7.7200E−04 |

TABLE 8-2

| Surface number | A16 | A18 | A20 | A22 | A24 |
|---|---|---|---|---|---|
| S1 | −1.0573E−05 | 3.1704E−06 | 2.3535E−06 | 0.0000E+00 | 0.0000E+00 |
| S2 | 4.4693E−06 | 8.1742E−07 | −2.9107E−06 | 0.0000E+00 | 0.0000E+00 |
| S3 | −2.2810E−05 | −4.2080E−05 | −1.3546E−05 | 0.0000E+00 | 0.0000E+00 |
| S4 | 1.5176E−05 | 1.1306E−05 | 3.5812E−06 | 0.0000E+00 | 0.0000E+00 |
| S5 | 1.7018E−05 | 2.0702E−05 | 1.4850E−05 | 0.0000E+00 | 0.0000E+00 |
| S6 | 7.7596E−05 | 2.9694E−05 | 2.9050E−05 | 0.0000E+00 | 0.0000E+00 |
| S7 | −6.8559E−06 | −5.7496E−06 | 5.0163E−07 | 0.0000E+00 | 0.0000E+00 |
| S8 | 6.0234E−06 | 2.1543E−06 | −2.9436E−06 | 0.0000E+00 | 0.0000E+00 |
| S9 | −1.7682E−04 | −1.0541E−04 | −4.8386E−05 | 0.0000E+00 | 0.0000E+00 |
| S10 | 5.1285E−04 | −2.2281E−04 | 1.0519E−05 | 0.0000E+00 | 0.0000E+00 |
| S11 | 2.0807E−04 | −6.4697E−04 | −6.8308E−05 | −4.8575E−07 | −2.9075E−05 |
| S12 | 6.9005E−04 | −1.0236E−07 | 3.1472E−04 | 7.8933E−05 | 2.4965E−05 |

Figure 15A:
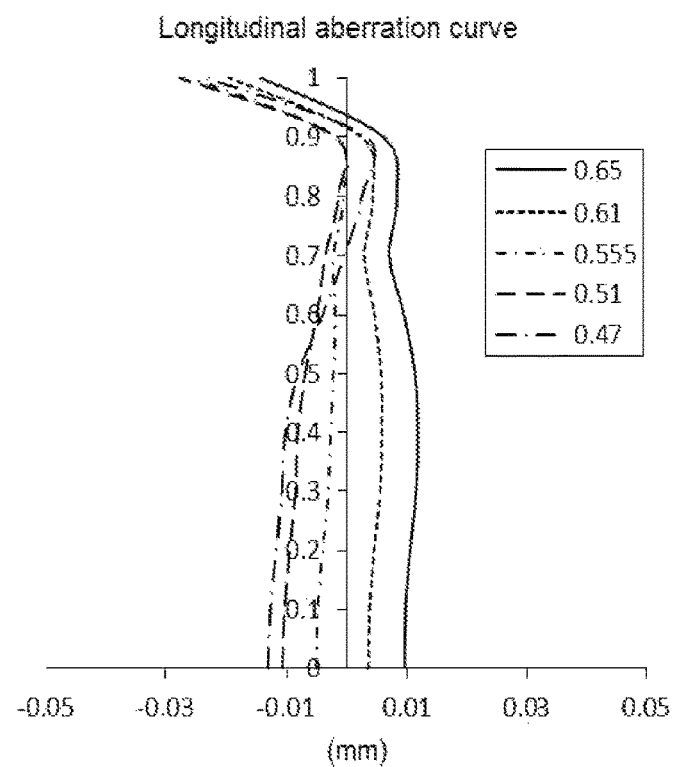
FIG. 15A to FIG. 15C show a longitudinal aberration curve, an astigmatism curve and a distortion curve of an imaging lens assembly of which a movable diaphragm is at a minimum distance from an imaging surface of the imaging lens assembly on an optical axis according to embodiment 4 respectively.
Figure 15B:
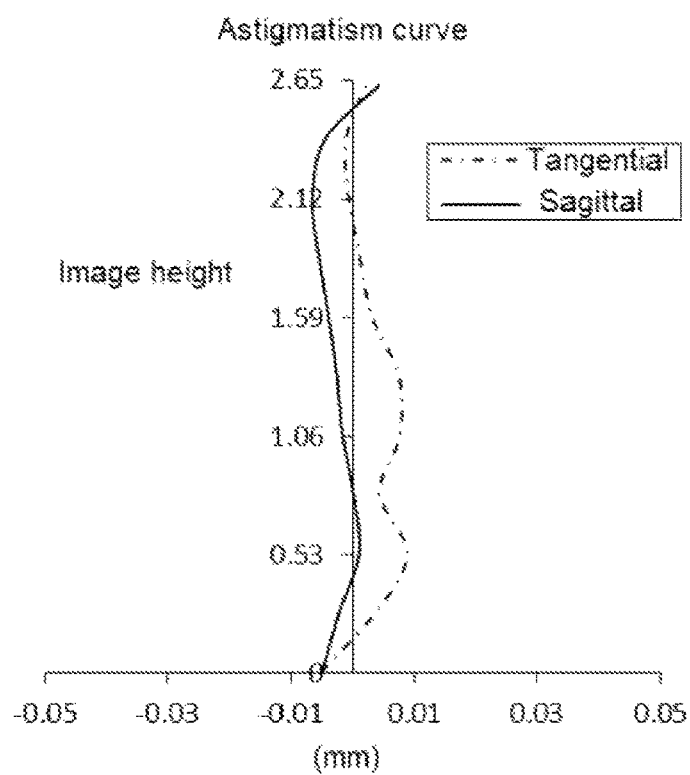
Figure 15C:
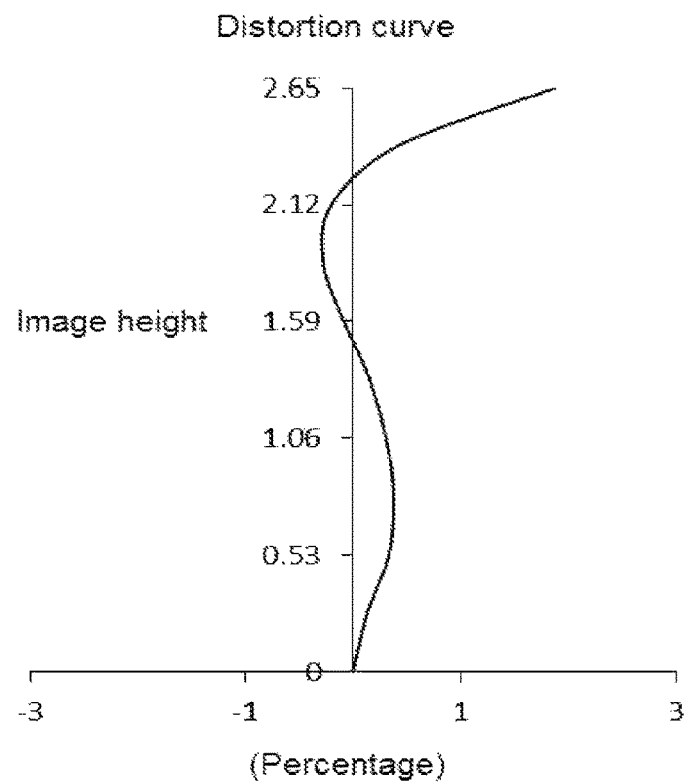
Figure 16A:
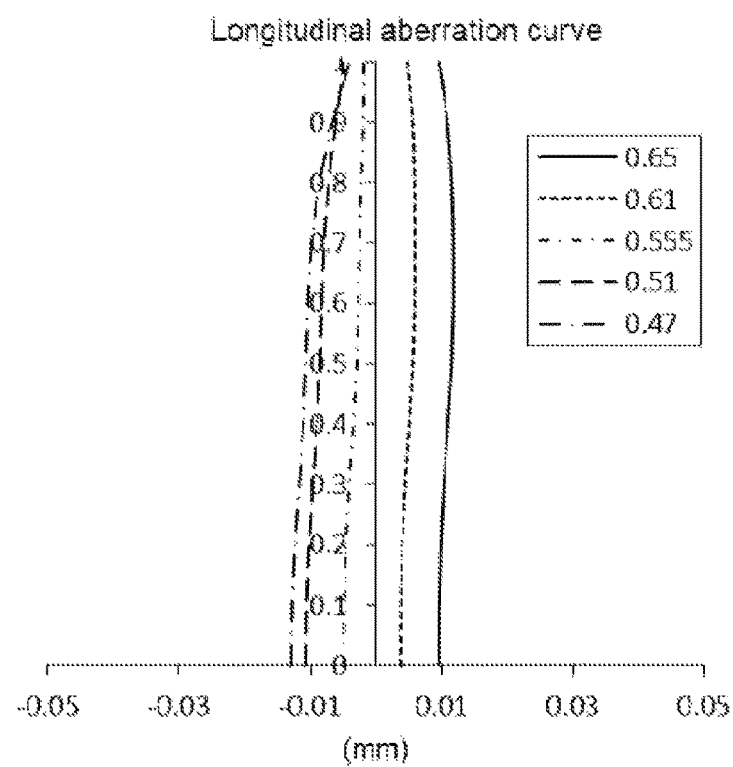
FIG. 16A to FIG. 16C show a longitudinal aberration curve, an astigmatism curve and a distortion curve of an imaging lens assembly of which a movable diaphragm is at a maximum distance from an imaging surface of the imaging lens assembly on an optical axis according to embodiment 4 respectively.
Figure 16B:
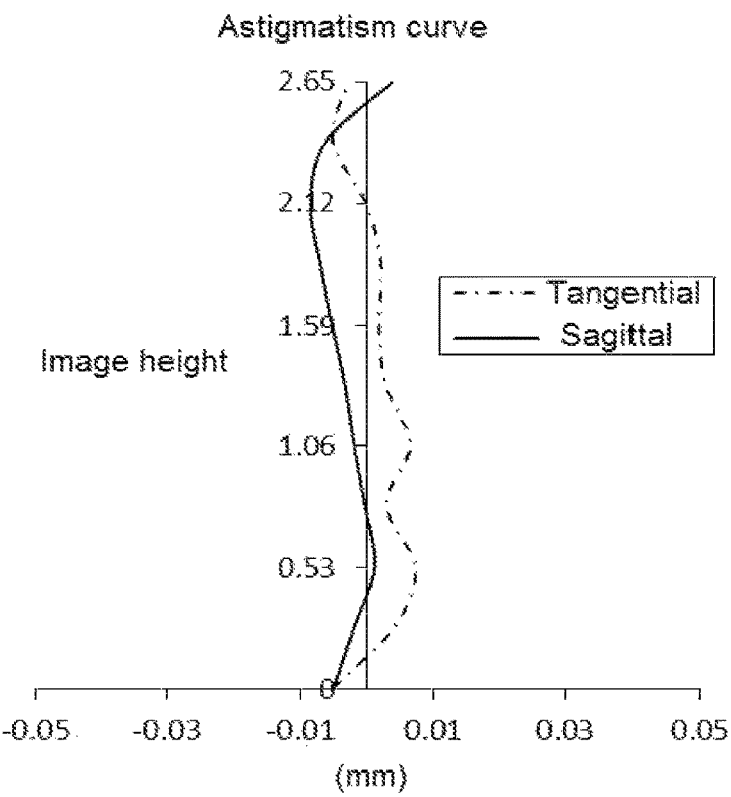
Figure 16C:
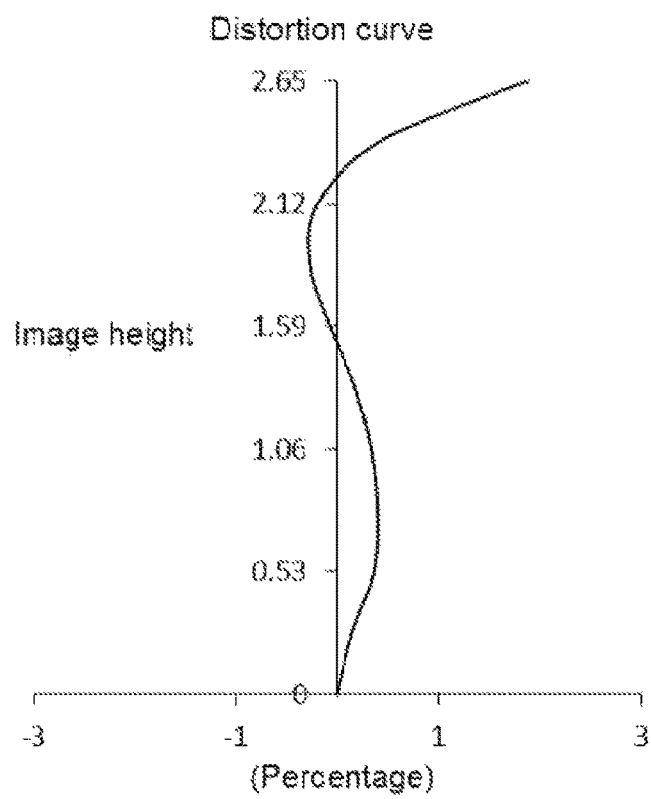

FIG. 15A and FIG. 16A show longitudinal aberration curves of the imaging lens assembly of which the movable diaphragm is at the maximum distance and the maximum distance from the imaging surface of the imaging lens assembly on the optical axis according to embodiment 4 respectively to represent deviation of a convergence focal point after light with different wavelengths passes through the lens. FIG. 15B and FIG. 16B show astigmatism curves of the imaging lens assembly of which the movable diaphragm is at the maximum distance and the maximum distance from the imaging surface of the imaging lens assembly on the optical axis according to embodiment 4 respectively to represent a meridian image surface curvature and a sagittal image surface curvature. FIG. 15C and FIG. 16C show distortion curves of the imaging lens assembly of which the movable diaphragm is at the maximum distance and the maximum distance from the imaging surface of the imaging lens assembly on the optical axis according to embodiment 4 respectively to represent distortion values corresponding to different image heights. According to FIG. 15A to FIG. 16C, it can be seen that the imaging lens assembly provided in embodiment 4 may achieve high imaging quality.

Embodiment 5

Figure 17:
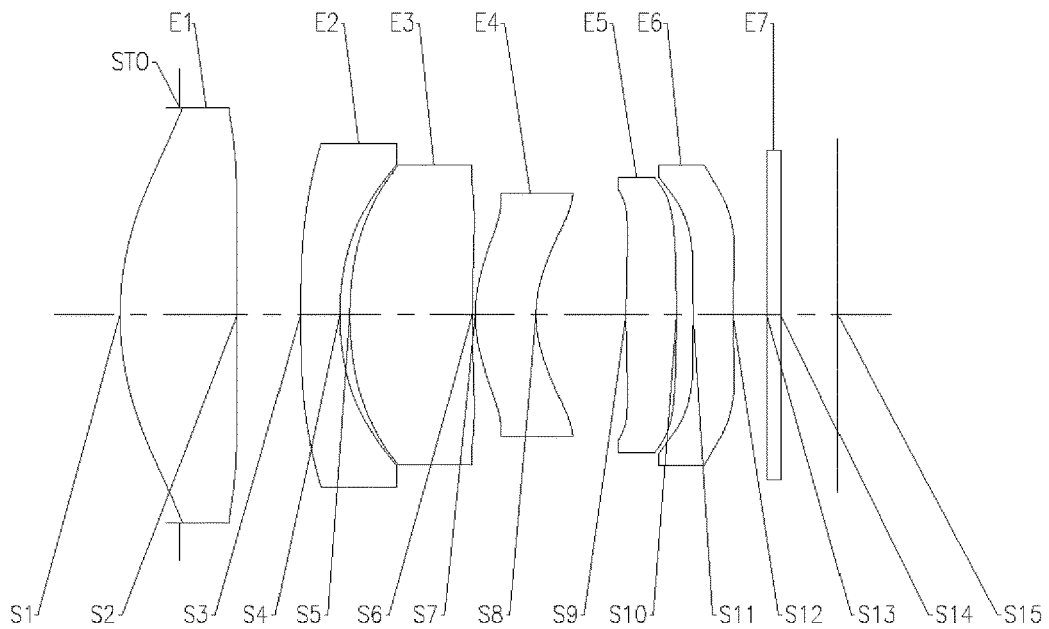
FIG. 17 shows a structure diagram of an imaging lens assembly according to embodiment 5 of the disclosure, a movable diaphragm being at a minimum distance from an imaging surface of the imaging lens assembly.
Figure 18:
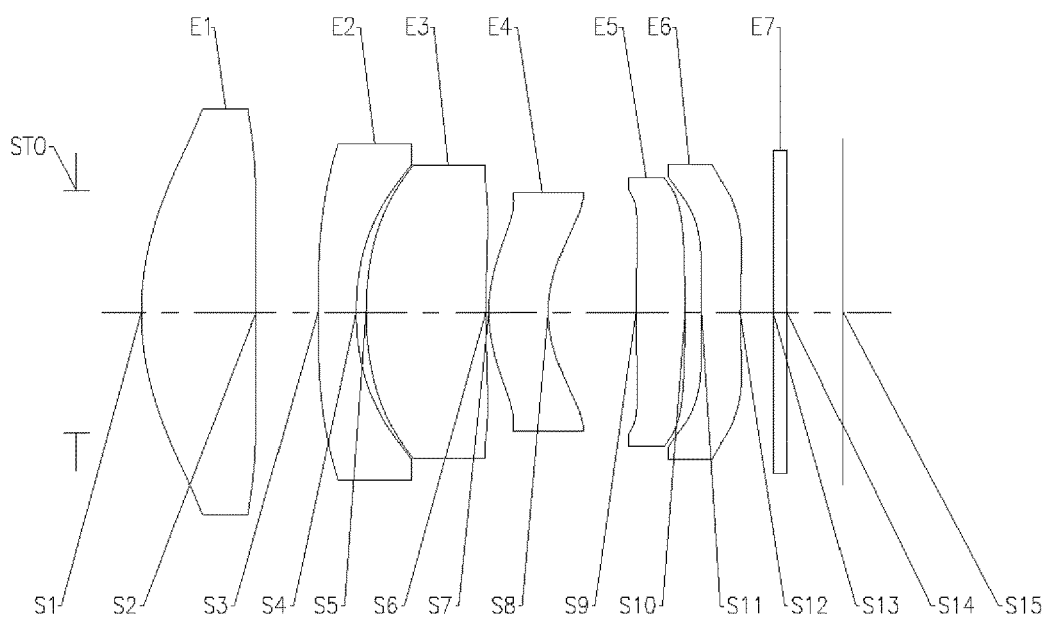
FIG. 18 shows a structure diagram of an imaging lens assembly according to embodiment 5 of the disclosure, a movable diaphragm being at a maximum distance from an imaging surface of the imaging lens assembly.

An imaging lens assembly according to embodiment 5 of the disclosure will be described below with reference to FIG. 17 to FIG. 20C. FIG. 17 and FIG. 18 are structure diagrams of an imaging lens assembly of which a movable diaphragm is at a minimum distance and a maximum distance from an imaging surface of the imaging lens assembly according to embodiment 5 of the disclosure respectively.

As shown in FIG. 17 and FIG. 18, the imaging lens assembly sequentially includes, from an object side to an image side, a movable diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the imaging lens assembly is 9.12 mm, TSmin is a distance from the movable diaphragm at the minimum distance from the imaging surface of the imaging lens assembly to the object-side surface of the first lens on an optical axis, a value of TSmin is −0.8935 mm, TSmax is a distance from the movable diaphragm at the maximum distance from the imaging surface of the imaging lens assembly to the object-side surface of the first lens on the optical axis, a value of TSmax is 1.0000 mm, an f-number FNOmin of the imaging lens assembly when the distance from the movable diaphragm to the imaging surface of the imaging lens assembly on the optical axis is minimum is 1.46, an f-number FNOmax of the imaging lens assembly when the distance from the movable diaphragm to the imaging surface of the imaging lens assembly on the optical axis is maximum is 2.45, and a maximum field of view of the imaging lens assembly is 31.7°.

Table 9 shows a basic parameter table of the imaging lens assembly of embodiment 5, and units of the curvature radius, the thickness/distance and the focal length are all mm. Tables 10-1 and Table 10-2 show high-order coefficients that can be used for each of aspheric mirror surfaces in embodiment 5. A surface type of each aspheric surface may be defined by formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspheric | 4.3701 | 1.7604 | 1.546 | 56.14 | 8.07 | 0.1714 |
| S2 | Aspheric | 500.0000 | 0.9431 | | | | −99.0000 |
| S3 | Aspheric | 29.2069 | 0.5860 | 1.645 | 23.53 | −7.05 | −88.8139 |
| S4 | Aspheric | 3.9028 | 0.1507 | | | | 0.2563 |
| S5 | Aspheric | 4.7678 | 1.8394 | 1.546 | 56.14 | 11.62 | 2.0846 |
| S6 | Aspheric | 16.5879 | 0.0452 | | | | 20.7790 |
| S7 | Aspheric | 2.2075 | 0.9119 | 1.546 | 56.14 | −2057.62 | −1.5913 |
| S8 | Aspheric | 1.8818 | 1.3408 | | | | −1.3469 |
| S9 | Aspheric | 21.6398 | 0.7565 | 1.667 | 20.37 | 11.60 | 31.8891 |
| S10 | Aspheric | −11.8730 | 0.2495 | | | | −99.0000 |
| S11 | Spherical | −22.9958 | 0.5943 | 1.546 | 56.14 | −12.93 | 98.1626 |
| S12 | Spherical | 10.2795 | 0.5090 | | | | −12.8642 |
| S13 | Spherical | Infinite | 0.2100 | 1.518 | 64.17 | | |
| S14 | Spherical | Infinite | 0.8570 | | | | |
| S15 | Spherical | Infinite | | | | | |

TABLE 10-1

| Surface number | A4 | A6 | A8 | A10 | A12 | A14 |
|---|---|---|---|---|---|---|
| S1 | −3.6897E−01 | −5.0283E−02 | −2.7684E−03 | 1.0676E−03 | 1.6754E−04 | −3.4121E−05 |
| S2 | −9.3999E−02 | −1.5904E−02 | 3.6287E−03 | 6.2870E−04 | −3.2155E−04 | 5.8458E−05 |
| S3 | 2.5778E−01 | −2.9138E−02 | 3.0549E−03 | −5.2664E−04 | −1.4464E−03 | 3.2905E−04 |
| S4 | 1.1600E−01 | −9.6170E−03 | −4.4747E−03 | 2.0844E−03 | −8.1700E−05 | −5.3218E−04 |
| S5 | 6.4168E−02 | −1.2150E−02 | −3.0907E−03 | 1.3560E−03 | −4.1898E−04 | −1.0686E−03 |
| S6 | −1.8914E−01 | −2.3426E−02 | 2.1710E−03 | 2.6592E−03 | −2.2600E−04 | 1.0552E−04 |
| S7 | −2.7210E−01 | −1.8242E−02 | −3.3025E−03 | 8.8272E−04 | 8.7128E−05 | −5.2704E−05 |
| S8 | −2.3851E−01 | −1.8670E−02 | −3.1106E−04 | 4.1016E−04 | 2.4639E−05 | −1.1108E−04 |
| S9 | −1.5087E−01 | −3.9033E−02 | −5.8185E−03 | −3.3952E−03 | −7.3435E−05 | −3.0533E−04 |
| S10 | −1.4501E−01 | −8.2524E−02 | 1.1217E−02 | −4.3563E−03 | 7.0524E−03 | 4.8434E−04 |
| S11 | −4.0714E−01 | −3.5874E−02 | 4.5078E−02 | −6.6885E−05 | 1.0981E−02 | −2.8563E−04 |
| S12 | −7.6307E−01 | 5.3201E−02 | 3.0584E−02 | 4.6843E−04 | 4.6642E−03 | −9.3869E−04 |

TABLE 10-2

| Surface number | A16 | A18 | A20 | A22 | A24 |
|---|---|---|---|---|---|
| S1 | −1.2134E−05 | 3.0584E−06 | 6.0452E−07 | 0.0000E+00 | 0.0000E+00 |
| S2 | 7.6530E−06 | −9.9462E−07 | −2.0864E−06 | 0.0000E+00 | 0.0000E+00 |
| S3 | 1.0225E−05 | −5.9751E−05 | −1.2061E−05 | 0.0000E+00 | 0.0000E+00 |
| S4 | 1.2202E−05 | 1.8506E−05 | 1.8124E−06 | 0.0000E+00 | 0.0000E+00 |
| S5 | 2.5253E−05 | 4.9376E−05 | 1.3906E−05 | 0.0000E+00 | 0.0000E+00 |
| S6 | 1.9263E−04 | 7.2714E−05 | 3.0788E−05 | 0.0000E+00 | 0.0000E+00 |
| S7 | −1.2479E−05 | −2.6167E−06 | 9.8685E−07 | 0.0000E+00 | 0.0000E+00 |
| S8 | 5.7108E−06 | 2.1020E−06 | 5.0659E−07 | 0.0000E+00 | 0.0000E+00 |
| S9 | −1.5381E−04 | −8.7563E−05 | −4.8855E−05 | 0.0000E+00 | 0.0000E+00 |
| S10 | 5.6779E−04 | −1.8025E−04 | −4.1550E−05 | 0.0000E+00 | 0.0000E+00 |
| S11 | 1.1488E−04 | −7.0250E−04 | −1.4459E−04 | −2.4160E−05 | −1.7799E−06 |
| S12 | 7.0232E−04 | 5.5451E−05 | 2.9396E−04 | 8.4835E−05 | 3.5191E−05 |

Figure 19A:
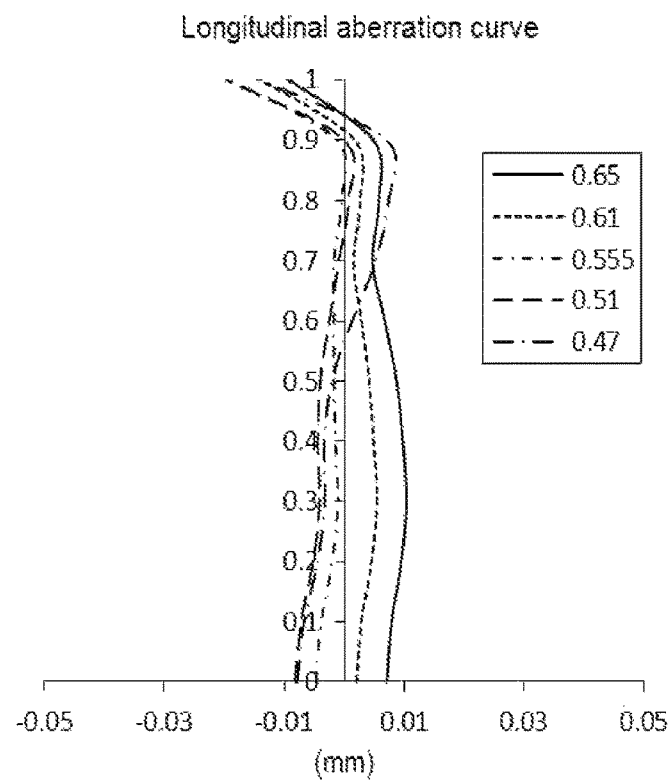
FIG. 19A to FIG. 19C show a longitudinal aberration curve, an astigmatism curve and a distortion curve of an imaging lens assembly of which a movable diaphragm is at a minimum distance from an imaging surface of the imaging lens assembly on an optical axis according to embodiment 5 respectively.
Figure 19B:
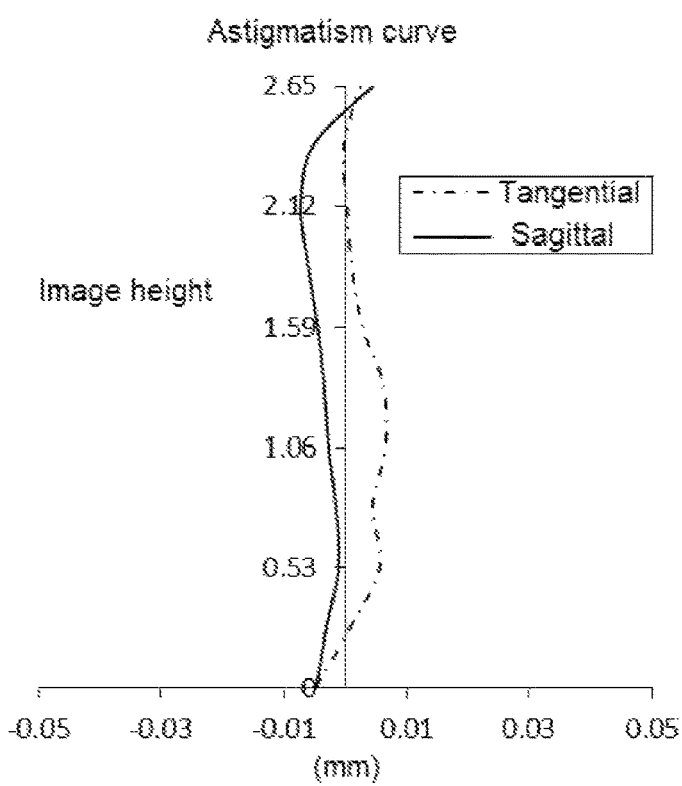
Figure 19C:
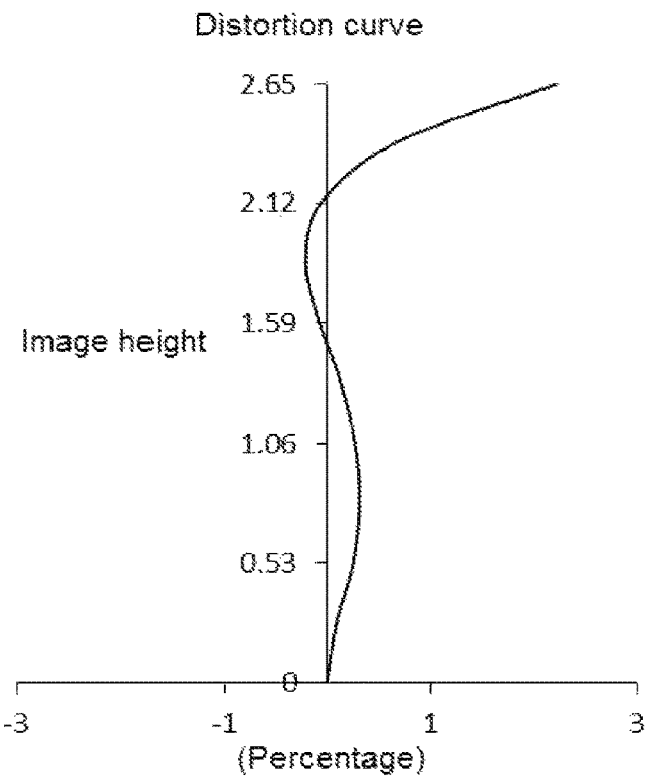
Figure 20A:
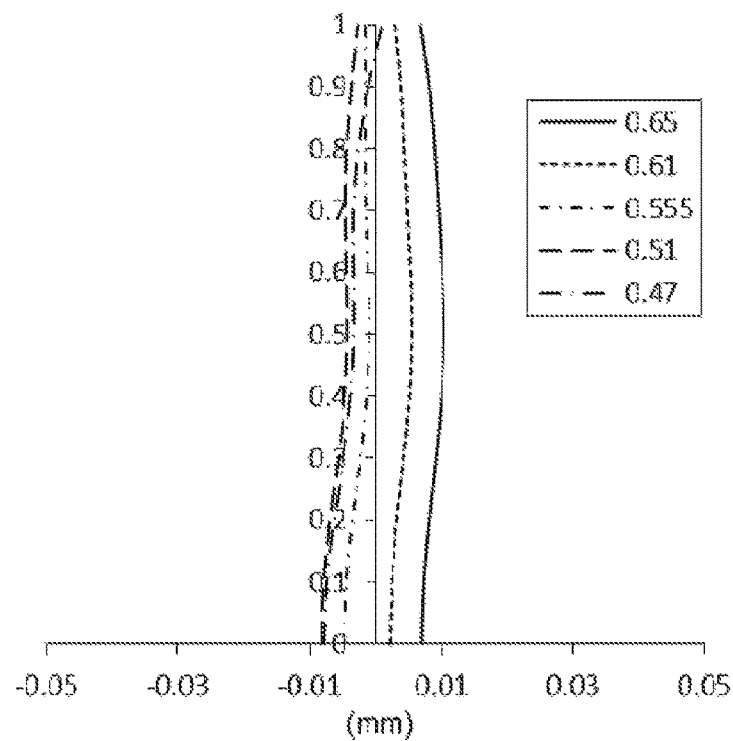
FIG. 20A to FIG. 20C show a longitudinal aberration curve, an astigmatism curve and a distortion curve of an imaging lens assembly of which a movable diaphragm is at a maximum distance from an imaging surface of the imaging lens assembly on an optical axis according to embodiment 5 respectively.
Figure 20B:
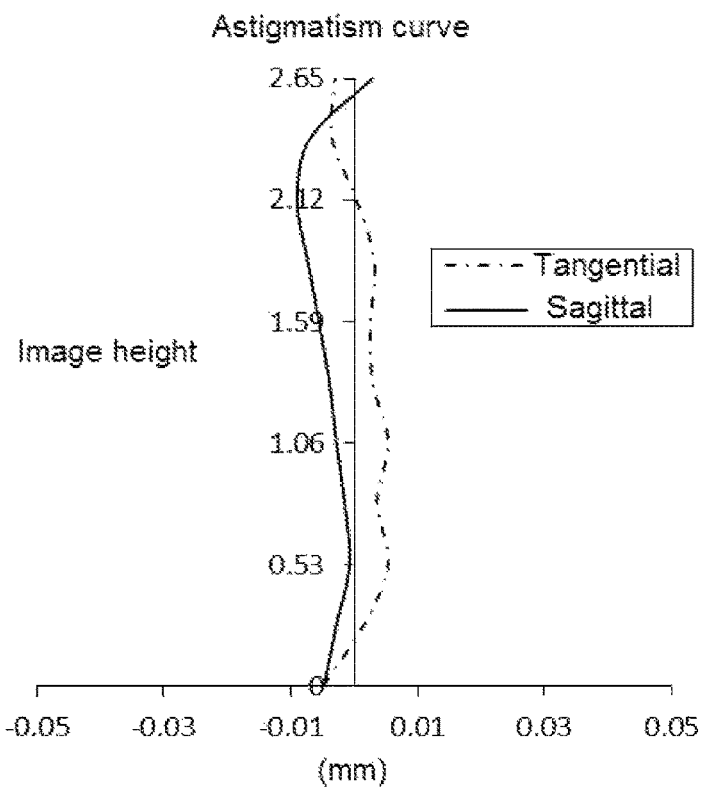
Figure 20C:
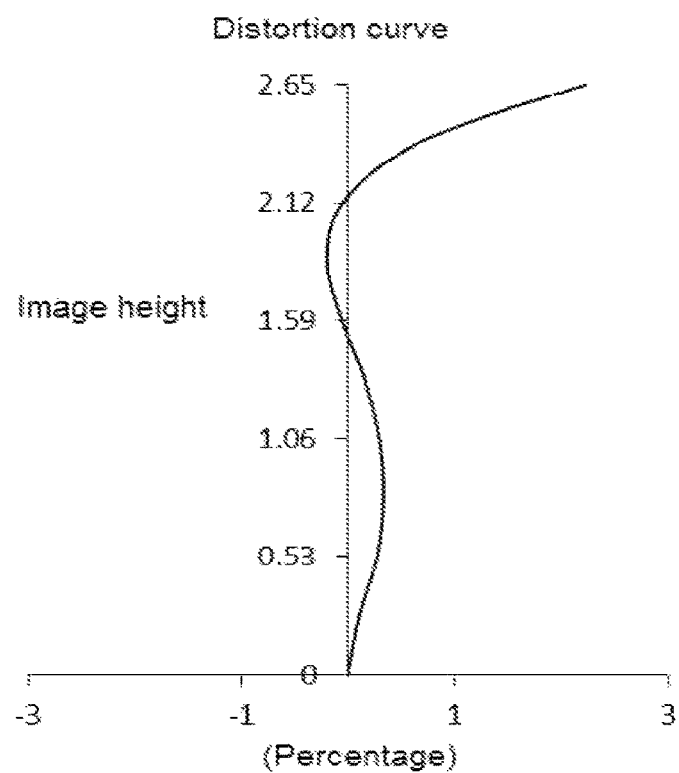

FIG. 19A and FIG. 20A show longitudinal aberration curves of the imaging lens assembly of which the movable diaphragm is at the maximum distance and the maximum distance from the imaging surface of the imaging lens assembly on the optical axis according to embodiment 5 respectively to represent deviation of a convergence focal point after light with different wavelengths passes through the lens. FIG. 19B and FIG. 20B show astigmatism curves of the imaging lens assembly of which the movable diaphragm is at the maximum distance and the maximum distance from the imaging surface of the imaging lens assembly on the optical axis according to embodiment 5 respectively to represent a meridian image surface curvature and a sagittal image surface curvature. FIG. 19C and FIG. 20C show distortion curves of the imaging lens assembly of which the movable diaphragm is at the maximum distance and the maximum distance from the imaging surface of the imaging lens assembly on the optical axis according to embodiment 5 respectively to represent distortion values corresponding to different image heights. According to FIG. 19A to FIG. 20C, it can be seen that the imaging lens assembly provided in embodiment 5 may achieve high imaging quality.

Embodiment 6

Figure 21:
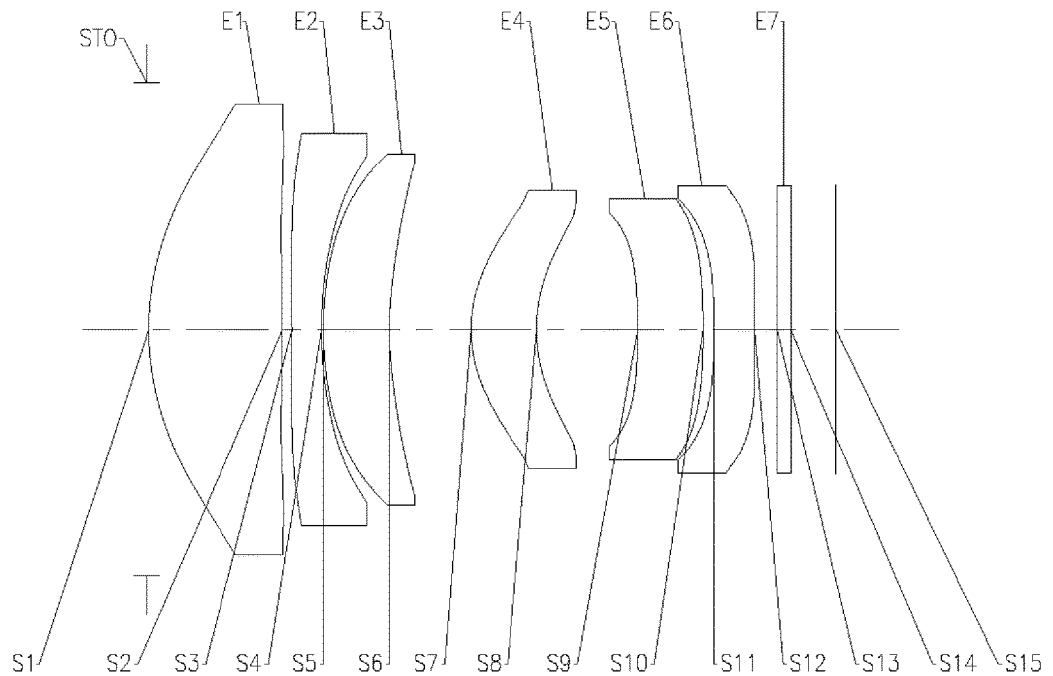
FIG. 21 shows a structure diagram of an imaging lens assembly according to embodiment 6 of the disclosure, a movable diaphragm being at a minimum distance from an imaging surface of the imaging lens assembly.
Figure 22:
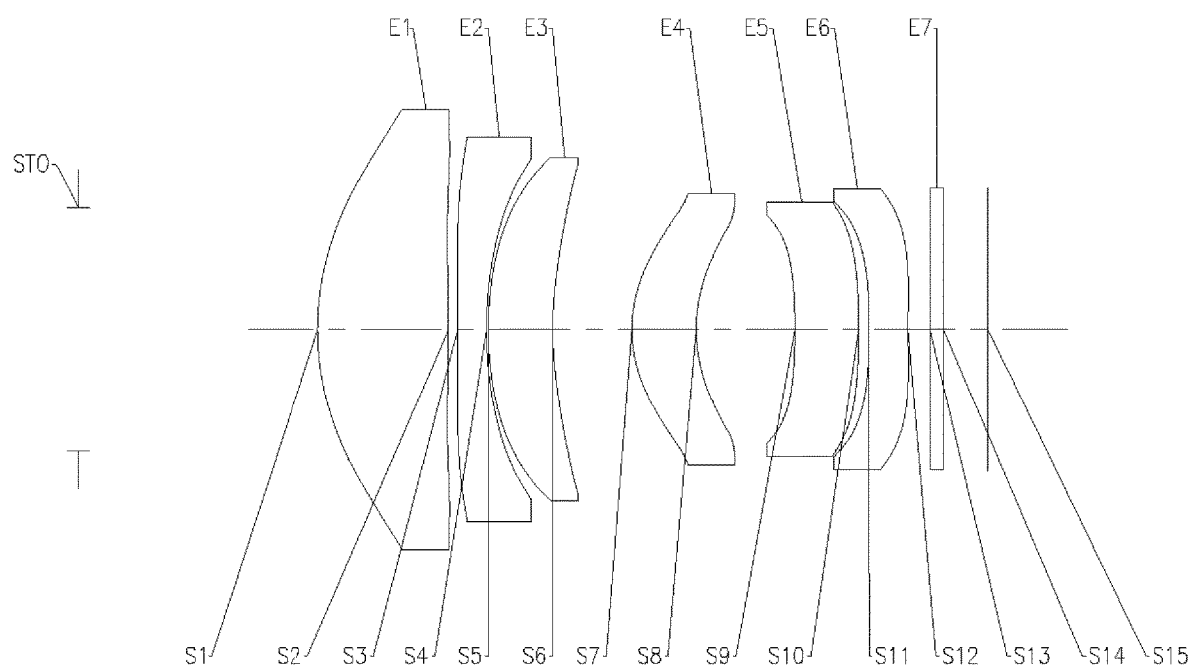
FIG. 22 shows a structure diagram of an imaging lens assembly according to embodiment 6 of the disclosure, a movable diaphragm being at a maximum distance from an imaging surface of the imaging lens assembly.

An imaging lens assembly according to embodiment 6 of the disclosure will be described below with reference to FIG. 21 to FIG. 24C. FIG. 21 and FIG. 22 are structure diagrams of an imaging lens assembly of which a movable diaphragm is at a minimum distance and a maximum distance from an imaging surface of the imaging lens assembly according to embodiment 6 of the disclosure respectively.

As shown in FIG. 21 and FIG. 22, the imaging lens assembly sequentially includes, from an object side to an image side, a movable diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the imaging lens assembly is 9.10 mm, TSmin is a distance from the movable diaphragm at the minimum distance from the imaging surface of the imaging lens assembly to the object-side surface of the first lens on an optical axis, a value of TSmin is 0.0300 mm, TSmax is a distance from the movable diaphragm at the maximum distance from the imaging surface of the imaging lens assembly to the object-side surface of the first lens on the optical axis, a value of TSmax is 3.7250 mm, an f-number FNOmin of the imaging lens assembly when the distance from the movable diaphragm to the imaging surface of the imaging lens assembly on the optical axis is minimum is 1.43, an f-number FNOmax of the imaging lens assembly when the distance from the movable diaphragm to the imaging surface of the imaging lens assembly on the optical axis is maximum is 2.40, and a maximum field of view of the imaging lens assembly is 27.2°.

Table 11 shows a basic parameter table of the imaging lens assembly of embodiment 6, and units of the curvature radius, the thickness/distance and the focal length are all mm. Table 12 shows high-order coefficients that can be used for each of aspheric mirror surfaces in embodiment 6. A surface type of each aspheric surface may be defined by the formula (1) given in embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspheric | 4.3306 | 2.0350 | 1.546 | 56.14 | 6.80 | 0.2245 |
| S2 | Aspheric | −21.6492 | 0.1426 | | | | 38.1325 |
| S3 | Aspheric | −27.8168 | 0.4500 | 1.645 | 23.53 | −9.52 | 73.1113 |
| S4 | Aspheric | 7.9218 | 0.0250 | | | | −32.8931 |
| S5 | Aspheric | 5.5140 | 1.0000 | 1.546 | 56.14 | −1224.26 | 0.9616 |
| S6 | Aspheric | 5.1187 | 1.2412 | | | | 1.3909 |
| S7 | Aspheric | 2.0584 | 1.0000 | 1.546 | 56.14 | 12.84 | −0.7081 |
| S8 | Aspheric | 2.4142 | 1.5349 | | | | −0.8189 |
| S9 | Aspheric | −11.8494 | 0.9891 | 1.667 | 20.37 | −50.91 | 33.2985 |
| S10 | Aspheric | −18.8062 | 0.1639 | | | | 39.1160 |
| S11 | Spherical | −26.9617 | 0.6131 | 1.546 | 56.14 | −18.42 | −99.0000 |
| S12 | Spherical | 16.1672 | 0.3436 | | | | 25.8236 |
| S13 | Spherical | Infinite | 0.2100 | 1.518 | 64.17 | | |
| S14 | Spherical | Infinite | 0.6924 | | | | |
| S15 | Spherical | Infinite | | | | | |

TABLE 12

| Surface number | A4 | A6 | A8 | A10 | A12 |
|---|---|---|---|---|---|
| S1 | −4.0803E−01 | −9.1820E−02 | −1.6229E−02 | 3.0264E−04 | 9.6678E−04 |
| S2 | 3.9123E−01 | −6.4120E−02 | 1.0991E−02 | 1.3003E−03 | 1.7472E−03 |
| S3 | 4.0804E−01 | −3.4751E−02 | 1.3466E−02 | −7.7833E−03 | 3.7491E−03 |
| S4 | 4.3775E−01 | −3.6479E−02 | 1.2652E−02 | −8.5831E−03 | 1.1244E−03 |
| S5 | 2.0958E−01 | 2.1709E−02 | −2.9062E−03 | 2.3068E−03 | −6.0404E−04 |
| S6 | −4.2087E−01 | 4.4696E−02 | −1.4840E−02 | 6.1878E−03 | −1.0723E−03 |
| S7 | −2.6359E−01 | −2.5451E−02 | −1.4009E−02 | −2.1372E−03 | −3.5760E−04 |
| S8 | −1.5115E−01 | −4.6029E−02 | −1.3195E−02 | −7.5713E−04 | 6.8889E−04 |
| S9 | −2.4335E−01 | −1.3712E−02 | −1.5708E−03 | 2.2594E−04 | 3.6652E−04 |
| S10 | −2.9933E−01 | 5.5270E−03 | −4.5721E−03 | 3.5665E−03 | 4.9433E−04 |
| S11 | −4.8748E−01 | 1.6410E−02 | −1.4976E−02 | 5.2905E−03 | 2.2395E−04 |
| S12 | −6.2856E−01 | 2.9065E−02 | −1.0128E−02 | 2.8382E−03 | −5.9816E−04 |

| Surface number | A14 | A16 | A18 | A20 |
|---|---|---|---|---|
| S1 | 2.0160E−04 | −1.9560E−05 | −2.8529E−05 | −3.8106E−06 |
| S2 | −3.0191E−04 | 1.5226E−04 | −4.9484E−05 | 3.2577E−05 |
| S3 | −9.2539E−04 | 4.2581E−04 | −1.3635E−04 | 3.4771E−05 |
| S4 | −3.8877E−04 | 2.8576E−04 | −6.3047E−05 | 4.4698E−06 |
| S5 | 3.3529E−04 | 1.0436E−04 | −5.1062E−05 | 1.3042E−05 |
| S6 | 2.4397E−04 | −6.3263E−05 | 1.9735E−05 | −2.8258E−06 |
| S7 | −4.0225E−05 | −1.1948E−05 | −9.8133E−06 | −5.1817E−06 |
| S8 | 2.6078E−04 | 4.5290E−05 | −6.9276E−06 | −4.6563E−06 |
| S9 | 1.9194E−04 | 6.8160E−05 | 2.6545E−05 | 5.0441E−06 |
| S10 | 8.0943E−05 | −9.9937E−05 | 5.5281E−05 | −2.9263E−06 |
| S11 | −2.3742E−05 | −2.1422E−04 | 6.1719E−05 | −1.8175E−06 |
| S12 | 3.2628E−05 | −5.5656E−05 | 4.2612E−05 | −3.8259E−06 |

Figure 23A:
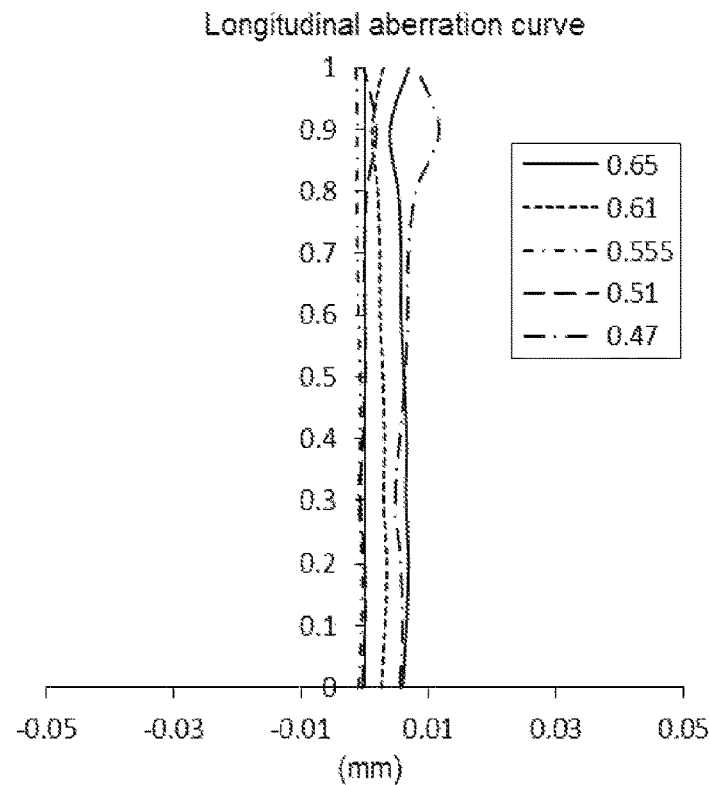
FIG. 23A to FIG. 23C show a longitudinal aberration curve, an astigmatism curve and a distortion curve of an imaging lens assembly of which a movable diaphragm is at a minimum distance from an imaging surface of the imaging lens assembly on an optical axis according to embodiment 6 respectively.
Figure 23B:
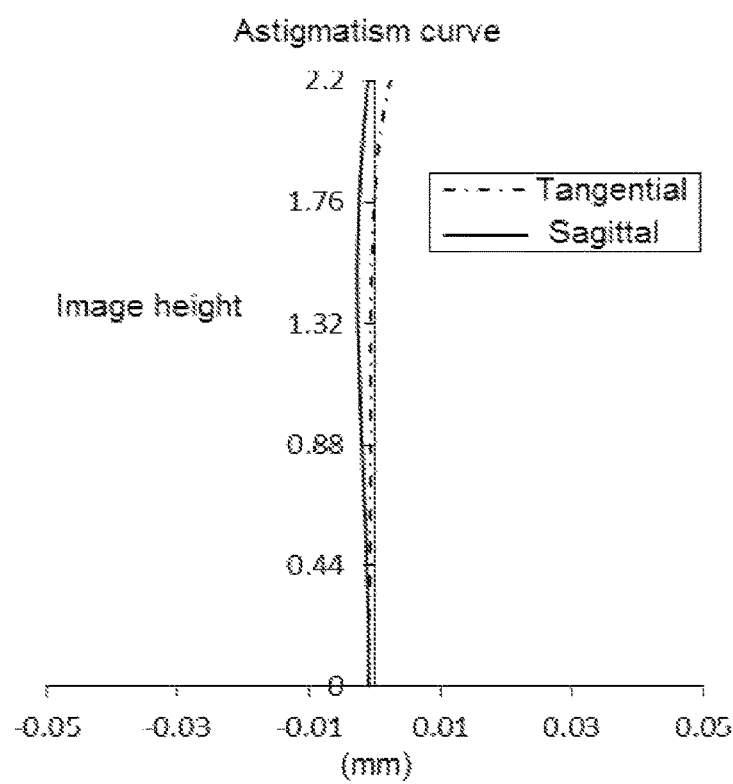
Figure 23C:
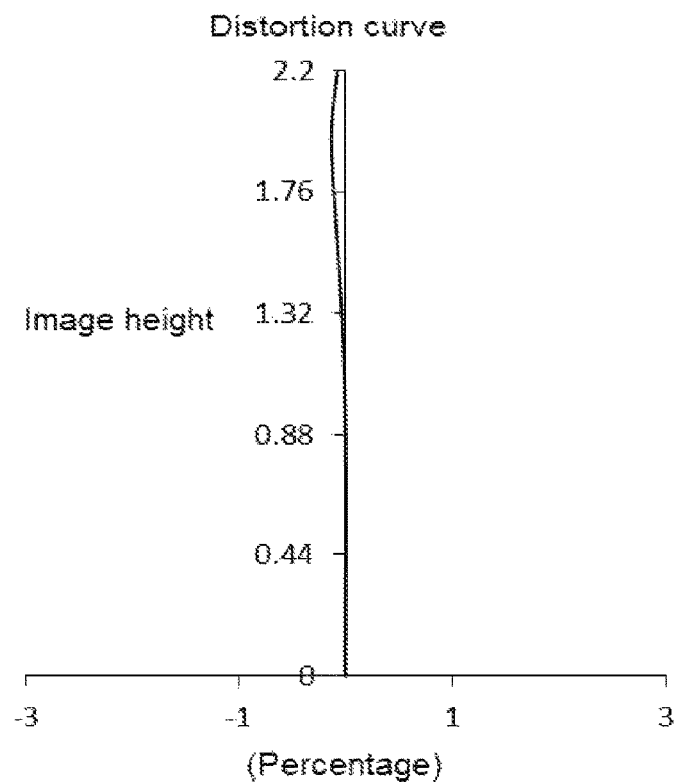
Figure 24A:
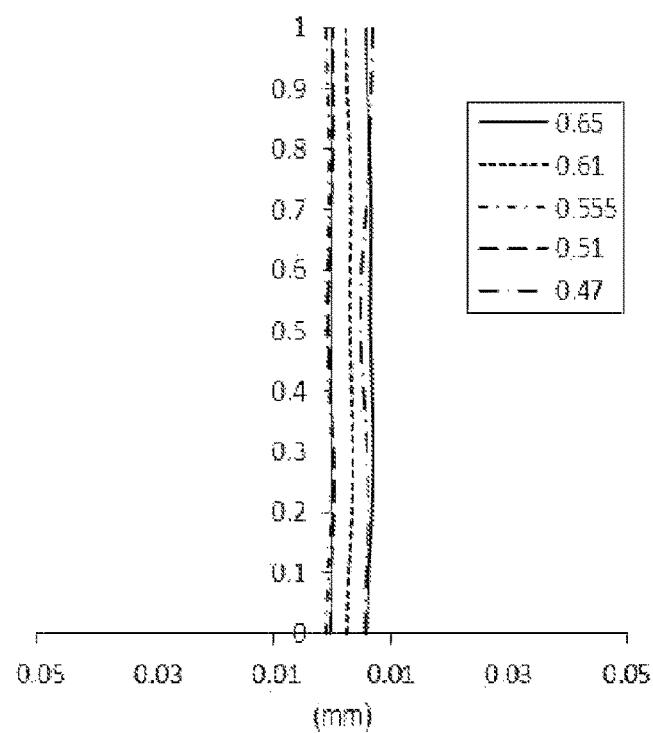
FIG. 24A to FIG. 24C show a longitudinal aberration curve, an astigmatism curve and a distortion curve of an imaging lens assembly of which a movable diaphragm is at a maximum distance from an imaging surface of the imaging lens assembly on an optical axis according to embodiment 6 respectively.
Figure 24B:
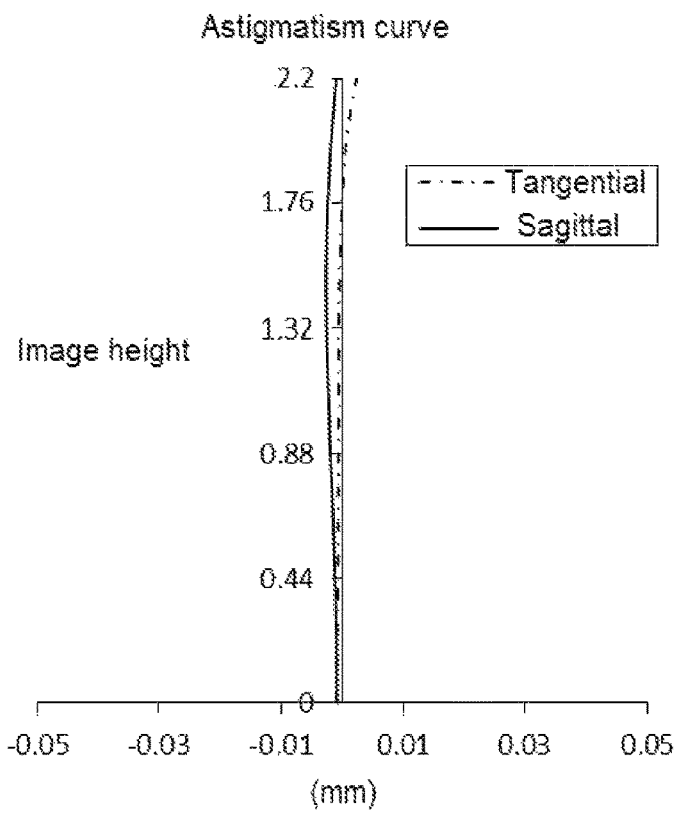
Figure 24C:
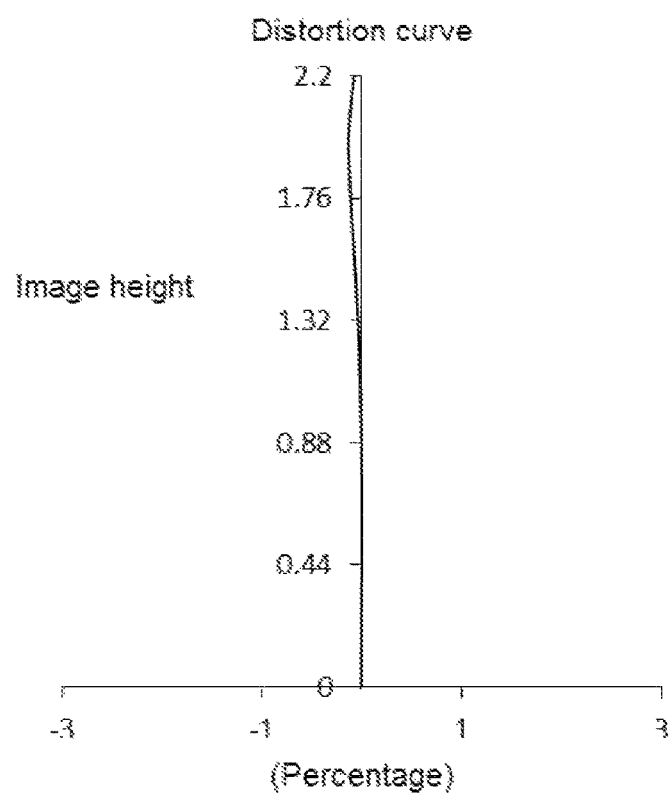

FIG. 23A and FIG. 24A show longitudinal aberration curves of the imaging lens assembly of which the movable diaphragm is at the maximum distance and the maximum distance from the imaging surface of the imaging lens assembly on the optical axis according to embodiment 6 respectively to represent deviation of a convergence focal point after light with different wavelengths passes through the lens. FIG. 23B and FIG. 24B show astigmatism curves of the imaging lens assembly of which the movable diaphragm is at the maximum distance and the maximum distance from the imaging surface of the imaging lens assembly on the optical axis according to embodiment 6 respectively to represent a meridian image surface curvature and a sagittal image surface curvature. FIG. 23C and FIG. 24C show distortion curves of the imaging lens assembly of which the movable diaphragm is at the maximum distance and the maximum distance from the imaging surface of the imaging lens assembly on the optical axis according to embodiment 6 respectively to represent distortion values corresponding to different image heights. According to FIG. 23A to FIG. 24C, it can be seen that the imaging lens assembly provided in embodiment 6 may achieve high imaging quality.

From the above, embodiment 1 to embodiment 6 meet a relationship shown in Table 13 respectively.

TABLE 13

| Conditional expression | embodiment | | | | | |
|---|---|---|---|---|---|---|
| | 1 | 2 | 3 | 4 | 5 | 6 |
| EPDmin/(|TSmin| + |TSmax|) | 2.27 | 2.45 | 2.30 | 1.90 | 1.96 | 1.01 |
| f/ImgH | 3.44 | 3.44 | 3.44 | 3.43 | 3.44 | 4.14 |
| R11/f | −2.33 | −2.34 | −2.33 | −2.41 | −2.52 | −2.96 |
| f/R10 + f/R11 | −1.18 | −1.19 | −1.20 | −1.18 | −1.16 | −0.82 |
| f6/f2 | 1.54 | 1.53 | 1.67 | 1.70 | 1.83 | 1.94 |
| f/f1 | 1.35 | 1.37 | 1.36 | 1.06 | 1.13 | 1.34 |
| f/f2 | −1.52 | −1.52 | −1.53 | −1.23 | −1.29 | −0.96 |
| |f/R4 − f/R5| | 0.80 | 0.85 | 0.63 | 0.42 | 0.42 | 0.50 |
| SAG22/SAG31 | 1.12 | 1.14 | 1.14 | 1.14 | 1.16 | 0.70 |
| (CT4 + SAG42)/T45 | 0.86 | 0.96 | 1.03 | 1.08 | 1.08 | 1.04 |
| (SAG52 − T56)/SAG61 | 1.11 | 1.13 | 1.17 | 1.10 | 1.12 | 1.06 |
| DT62/DT11 | 0.72 | 0.72 | 0.72 | 0.72 | 1.00 | 0.64 |
| (DT31 − DT41)/(DT52 − DT41) | 1.88 | 1.75 | 1.78 | 1.79 | 1.79 | −4.51 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned imaging lens assembly.

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:
1. An imaging lens assembly, sequentially comprising, from an object side to an image side along an optical axis:
a movable diaphragm,
a first lens with a positive refractive power,
a second lens with a negative refractive power, a third lens with a refractive power,
a fourth lens with a refractive power,
a fifth lens with a refractive power and
a sixth lens with a negative refractive power,
wherein TSmin is a distance from the movable diaphragm at a minimum distance from an imaging surface of the imaging lens assembly to an object-side surface of the first lens on the optical axis, TSmax is a distance from the movable diaphragm at a maximum distance from the imaging surface of the imaging lens assembly to the object-side surface of the first lens on the optical axis, EPDmin is a minimum entrance pupil diameter (EPD) of the imaging lens assembly, TSmin and TSmax and EPDmin meet $1 \leq \text{EPDmin}/(|\text{TSmin}|+|\text{TSmax}|) \leq 2.5$;
a total effective focal length f of the imaging lens assembly and a curvature radius R11 of an object-side surface of the sixth lens meet $-3.5 < R11/f < -2.0$.

2. The imaging lens assembly according to claim 1, wherein ImgH is a half of a diagonal length of an effective pixel region on an imaging surface of the imaging lens assembly, the total effective focal length f of the imaging lens assembly and ImgH meet $3.0 < f/\text{ImgH} < 5.0$.

3. The imaging lens assembly according to claim 1, wherein the total effective focal length f of the imaging lens assembly, a curvature radius R10 of an image-side surface of the fifth lens and the curvature radius R11 of the object-side surface of the sixth lens meet $-1.5 < f/R10+f/R11 \leq -0.8$.

4. The imaging lens assembly according to claim 1, wherein an effective focal length f2 of the second lens and an effective focal length f6 of the sixth lens meet $1.5 \leq f6/f2 \leq 2.0$.

5. The imaging lens assembly according to claim 4, wherein the total effective focal length f of the imaging lens assembly and an effective focal length f1 of the first lens meet $1.0 < f/f1 < 1.5$.

6. The imaging lens assembly according to claim 1, wherein the total effective focal length f of the imaging lens assembly and an effective focal length f2 of the second lens meet $-1.6 < f/f2 < -0.9$.

7. The imaging lens assembly according to claim 1, wherein the total effective focal length f of the imaging lens assembly, a curvature radius R4 of an image-side surface of the second lens and a curvature radius R5 of an object-side surface of the third lens meet $|f/R4-f/R5| < 1.0$.

8. The imaging lens assembly according to claim 1, wherein SAG22 is a distance from an intersection point of an image-side surface of the second lens and the optical axis to a maximum effective radius vertex of the image-side surface of the second lens on the optical axis, and SAG31 is a distance from an intersection point of an object-side surface of the third lens and the optical axis to a maximum effective radius vertex of the object-side surface of the third lens on the optical axis, SAG22 and SAG31 meet $0.7 \leq \text{SAG22}/\text{SAG31} \leq 1.2$.

9. The imaging lens assembly according to claim 8, wherein SAG42 is a distance from an intersection point of an image-side surface of the fourth lens and the optical axis to a maximum effective radius vertex of the image-side surface of the fourth lens on the optical axis, a center thickness CT4 of the fourth lens on the optical axis and a spacing distance T45 of the fourth lens and the fifth lens on the optical axis and SAG42 meet $0.8 \leq (CT4+\text{SAG42})/T45 \leq 1.1$.

10. The imaging lens assembly according to claim 9, wherein SAG52 is a distance from an intersection point of an image-side surface of the fifth lens and the optical axis to a maximum effective radius vertex of the image-side surface of the fifth lens on the optical axis, SAG61 is a distance from an intersection point of an object-side surface of the sixth lens and the optical axis to a maximum effective radius vertex of the object-side surface of the sixth lens on the optical axis and a spacing distance T56 of the fifth lens and the sixth lens on the optical axis, SAG52 and SAG61 meet $1.0 \leq (\text{SAG52}-T56)/\text{SAG61} \leq 1.2$.

11. The imaging lens assembly according to claim 1, wherein a maximum effective radius DT11 of the object-side surface of the first lens and a maximum effective radius DT62 of an image-side surface of the sixth lens meet $0.5 < DT62/DT11 \leq 1.0$.

12. The imaging lens assembly according to claim 11, wherein a maximum effective radius DT31 of an object-side surface of the third lens, a maximum effective radius DT41 of an object-side surface of the fourth lens and a maximum effective radius DT52 of an image-side surface of the fifth lens meet $1.5 < (DT31-DT41)/(DT52-DT41) < 2.0$.

13. An imaging lens assembly, sequentially comprising, from an object side to an image side along an optical axis:
a movable diaphragm,
a first lens with a positive refractive power,
a second lens with a negative refractive power,
a third lens with a refractive power,
a fourth lens with a refractive power,
a fifth lens with a refractive power and
a sixth lens with a negative refractive power,
wherein a total effective focal length f of the imaging lens assembly and a curvature radius R11 of an object-side surface of the sixth lens meet $-3.5 < R11/f < -2.0$.

* * * * *